(12) United States Patent
Suzuka

(10) Patent No.: US 9,606,370 B2
(45) Date of Patent: Mar. 28, 2017

(54) IMAGING APPARATUS

(71) Applicant: HOYA CORPORATION, Tokyo (JP)

(72) Inventor: Shinya Suzuka, Saitama (JP)

(73) Assignee: HOYA CORPORATION, Tokyo (JP)

( * ) Notice: Subject to any disclaimer, the term of this patent is extended or adjusted under 35 U.S.C. 154(b) by 90 days.

(21) Appl. No.: 14/167,320

(22) Filed: Jan. 29, 2014

(65) Prior Publication Data

US 2014/0218799 A1 Aug. 7, 2014

(30) Foreign Application Priority Data

Feb. 4, 2013 (JP) .................. 2013-019480

(51) Int. Cl.
*G02B 27/64* (2006.01)
*G02B 13/00* (2006.01)

(52) U.S. Cl.
CPC ....... *G02B 27/646* (2013.01); *G02B 13/0065* (2013.01)

(58) Field of Classification Search
CPC .............. G02B 27/646; G02B 13/0015; G02B 13/0065; G02B 7/18; G03B 5/00
USPC ......................... 359/555, 557, 736
See application file for complete search history.

(56) References Cited

U.S. PATENT DOCUMENTS

| 2006/0127073 | A1 | 6/2006 | Yasuda | |
|---|---|---|---|---|
| 2006/0268431 | A1 | 11/2006 | Jin | |
| 2007/0297781 | A1* | 12/2007 | Kitano | ............................ 396/55 |
| 2008/0266404 | A1 | 10/2008 | Sato | |
| 2010/0014171 | A1* | 1/2010 | Yamamoto et al. | .......... 359/736 |
| 2010/0188551 | A1* | 7/2010 | Nagaoka | ................. G02B 7/021 |
| | | | | 348/335 |
| 2010/0284093 | A1* | 11/2010 | Tashiro | ................. G02B 15/177 |
| | | | | 359/691 |
| 2011/0044672 | A1 | 2/2011 | Ito | |

(Continued)

FOREIGN PATENT DOCUMENTS

| JP | 2006-166202 | 6/2006 |
|---|---|---|
| JP | 2006-259247 | 9/2006 |

(Continued)

OTHER PUBLICATIONS

U.S. Appl. No. 13/859,916 to Hiroshi Nomura et al., which was filed Apr. 10, 2013.

(Continued)

*Primary Examiner* — Darryl J Collins
*Assistant Examiner* — Journey Sumlar
(74) *Attorney, Agent, or Firm* — Greenblum & Bernstein, P.L.C.

(57) ABSTRACT

An imaging apparatus includes a front lens group having a front lens element and a prism, in that order from an object side, light rays exiting from the front lens element along a first optical axis being reflected by the prism to travel along a second optical axis nonparallel to the first optical axis, a rear lens group, and an anti-shake system. The anti-shake system includes a base member supporting the prism, a movable frame supporting the front lens element; and opposing guide members on opposite sides of the prism on both sides of a reference plane, respectively, in which the first and second optical axes lie, to support the movable frame to allow the movable frame to move along the plane orthogonal to the first optical axis relative to the base member.

14 Claims, 11 Drawing Sheets

(56) References Cited

U.S. PATENT DOCUMENTS

2011/0181740 A1 7/2011 Watanabe et al.
2011/0317060 A1* 12/2011 Nakayama .................... 348/357

FOREIGN PATENT DOCUMENTS

| | | |
|---|---|---|
| JP | 2006-330439 | 12/2006 |
| JP | 2007-228005 | 9/2007 |
| JP | 2008-257106 | 10/2008 |
| JP | 2008-268700 | 11/2008 |
| JP | 2009-86319 | 4/2009 |
| JP | 2010-128384 | 6/2010 |
| JP | 2010-204341 | 9/2010 |
| JP | 2011-65145 | 3/2011 |
| JP | 4717529 | 7/2011 |
| JP | 4789655 | 10/2011 |
| JP | 2012-120303 | 6/2012 |
| WO | 2010/038685 | 4/2010 |

OTHER PUBLICATIONS

U.S. Appl. No. 14/155,599 to Hiroshi Nomura et al., which was filed Jan. 15, 2014.
U.S. Appl. No. 14/032,775 to Hiroshi Nomura et al., which was filed Sep. 20, 2013.
U.S. Appl. No. 14/032,792 to Hiroshi Nomura et al., which was filed Sep. 20, 2013.
U.S. Appl. No. 14/167,277 to Shinya Suzuka, which was filed Jan. 29, 2014.
Office Action issued in Japan Counterpart Patent Appl. No. 2013-019480, dated Oct. 25, 2016 , along with an English translation thereof.

* cited by examiner

IMAGING APPARATUS

BACKGROUND OF THE INVENTION

1. Field of the Invention

The present invention relates to an imaging apparatus equipped with an anti-shake (image shake correction/image stabilizing/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and tablet computers, etc., equipped with a camera, have become widespread, and there has been a demand to miniaturize of the imaging units incorporated in these types of mobile electronic devices. In order to miniaturize an imaging unit, it is known to construct an optical system of an imaging unit out of a bending optical system which reflects (bends) light rays using a reflecting surface of a reflector such as a prism or a mirror. Using a bending optical system in an imaging unit makes it possible to achieve a reduction in thickness of the imaging unit, especially in the direction of travel of the incident light emanating from an object which is to be photographed.

In addition, there is a demand for imaging units to be equipped with a so-called anti-shake (image shake correction/image stabilizing/shake reduction) system that is designed to reduce image shake on an image plane that is caused by vibrations such as hand shake. The following four different types of imaging units are known in the art as imaging units using a bending optical system which are equipped with an anti-shake system: a first type (disclosed in Japanese Unexamined Patent Publication Nos. 2009-86319 and 2008-268700) in which an image sensor is moved in directions orthogonal to an image plane to reduce image shake, a second type (disclosed in Japanese Unexamined Patent Publication No. 2010-128384 and Japanese Patent No. 4,789,655) in which a lens disposed behind a reflector (on the image plane side) that has a reflecting surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector (a reflecting surface thereof) and the angle of a lens adjacent to the reflector are changed to reduce image shake, and a fourth type (disclosed in Japanese Unexamined Patent Publication Nos. 2006-166202 and 2006-259247) in which the entire imaging unit is tilted/inclined to reduce image shake.

An anti-shake system using voice coil motors (VCMs), which generate force (driving force) by application of a current (voltage) across the terminals of the coil positioned inside the magnetic field of a permanent magnet, for driving an optical element (anti-shake optical element) to reduce image shake is known in the art (disclosed in Japanese Unexamined Patent Publication Nos. 2009-86319, 2010-128384, 2007-228005, and Japanese Patent No. 4,789,655). Information on the position of the anti-shake optical element can be obtained with sensors (e.g., Hall sensors) that measure the change in the magnetic field.

The first type of anti-shake system tends to become complicated in structure and tends to increase in cost because a circuit board connected to the image sensor is moved in order to follow movements of the image sensor, which requires electrical components that are provided around the image sensor to also be movable components in addition to the image sensor. In addition, the periphery of the imaging surface of the image sensor is required to be dust tight; however, in small imaging units intended for being incorporated into a mobile phone or a tablet computer, etc., it is difficult to secure sufficient space for allowing the image sensor to perform an anti-shake (image shake correction/image-stabilizing/shake reduction) operation while maintaining the dust-tight structure of the image sensor.

The second type of anti-shake system has a structure such that the moving direction of the lens group, disposed behind the reflector, during an anti-shake operation corresponds to the direction of the thickness of the imaging unit (i.e., the forward/rearward direction of the imaging unit, wherein the direction toward an object to be photographed refers to the forward (front) direction of the imaging unit), and hence, there is a problem with providing enough space to house such an anti-shake structure in a slimmed-down imaging unit. In other words, the slimming-down of the imaging unit is limited if this type of anti-shake system is used. There is a similar problem also in the type of anti-shake system in which an image sensor is moved, instead of a lens group, in the direction of the thickness of the imaging unit.

The third type of anti-shake system requires a large space for allowing the reflector and the lens group to tilt/incline, and accordingly, the imaging unit is easily enlarged in size. The fourth type of anti-shake system requires a larger space for allowing the entire imaging unit to be tilted/inclined to reduce image shake.

Accordingly, there has been a demand for an anti-shake system that utilizes a different manner for driving an anti-shake optical element from those of the above described types of imaging units and that is advantageous for miniaturization and slimming of the imaging apparatus. A mechanism which supports the anti-shake optical element and a device which gives a driving force to the anti-shake optical element, in particular, have been desired to be simple and compact in size.

SUMMARY OF THE INVENTION

The present invention has been devised in view of the above mentioned drawbacks and provides an imaging apparatus which is equipped with an anti-shake system and in which a bending optical system forms an optical path, wherein miniaturization of the imaging apparatus is achieved.

In an embodiment, an imaging apparatus is provided, including a front lens group which constitutes part of an imaging optical system of the imaging apparatus and is provided at a fixed position with respect to an optical axis direction, wherein the front lens group includes at least one front lens element and a prism, in that order from an object side, and wherein light rays exiting from the front lens element along a first optical axis are reflected by the prism to travel along a second optical axis that is nonparallel to the first optical axis; at least one rear lens group which constitutes another part of the imaging optical system and is provided closer to an image plane than the front lens group; and an anti-shake system which drives the front lens element along a plane orthogonal to the first optical axis, in response to vibrations applied to the imaging optical system, to reduce image shake on the image plane. The anti-shake system includes a base member which supports at least the prism of the front lens group; a movable frame which supports the front lens element of the front lens group; and at least two opposing guide members which are arranged, as viewed along the first optical axis, along opposite sides of the prism on both sides of a reference plane, respectively, in which the first optical axis and the second optical axis lie, to support the movable frame in a manner to allow the movable frame to move along the plane that is orthogonal to the first optical axis relative to the base member.

It is desirable for the anti-shake system to further include a third guide member, in addition to the two opposing guide members, which supports the movable frame in a manner to allow the movable frame to move along the plane that is orthogonal to the first optical axis relative to the base member. The third guide member is positioned on one side of a second reference plane, which includes the first optical axis and is orthogonal to the reference plane, so that the second optical axis extends on the other side of the second reference plane in a direction away from the second reference plane.

It is desirable for the opposing guide members to include two side guide shafts, axes of which lie in a plane orthogonal to the first optical axis. The movable member includes two side slidable support portions, each of which holds an associated one of the side guide shafts from both sides thereof in a direction parallel to the first optical axis so that each of the side slidable support portions is supported by the associated side guide shaft to be slidable along the plane orthogonal to the first optical axis.

It is desirable for the third guide member to include a third guide shaft, an axis of which lies in a plane orthogonal to the first optical axis. The movable member includes a third slidable support portion which holds the third guide shaft from both sides thereof in a direction parallel to the first optical axis so that the third slidable support portion is supported by the third guide shaft to be slidable along the plane orthogonal to the first optical axis.

It is desirable for each of the side slidable support portions of the movable frame and the base member to include an open groove having an opening into which an associated side guide shaft is insertable in a direction to approach the first optical axis along the plane that is orthogonal to the first optical axis. The open groove of the base member fixedly holds an associate side guide shaft that is inserted into an associated opening. The open groove of each the side slidable support portion of the movable frame slidably contacts an associated the side guide shaft that is inserted into associated the opening.

It is desirable for each of the side slidable support portions to include at least one projection which is formed in an associated open groove to project in a direction parallel to the first optical axis to contact an associated the side guide shaft.

It is desirable for the imaging apparatus to include a cover member which is mounted to the base member and includes an outer surrounding wall for closing the openings of the open grooves of the side slidable support portions of the movable frame and the base member.

It is desirable for the axes of the side guide shafts to be parallel to the reference plane and substantially equi-distant from the reference plane.

It is desirable for an axis of the third guide shaft to be parallel to the second reference plane.

It is desirable for the anti-shake system to include a first voice coil motor which includes a first coil and a first magnet that are mounted to one and the other of the base member and the movable frame, respectively, so as to be opposed in a direction parallel to the first optical axis, wherein the first voice coil motor generates a driving force in a first direction orthogonal to a magnetic pole boundary line of the first magnet upon the first coil being energized; and a second voice coil motor which includes a second coil and a second magnet that are mounted to the one and the other of the base member and the movable frame, respectively, so as to be opposed in a direction parallel to the first optical axis, wherein the second voice coil motor generates a driving force in a second direction orthogonal to a magnetic pole boundary line of the second magnet upon the second coil being energized. The first magnet and the second magnet are positioned so that directions of the magnetic pole boundary lines thereof are orthogonal to each other in a plane orthogonal to the first optical axis. The first coil and the second coil are positioned to face the first magnet and the second magnet, respectively, in a direction parallel to the first optical axis. In this case, space utilization can be enhanced if the centers of the first magnet and the second magnet and the centers of the first coil and the second coil are positioned on one side of a second reference plane which includes the first optical axis and is orthogonal to the reference plane, wherein the second optical axis extends on the other side of the second reference plane in a direction away from the second reference plane.

It is desirable for the opposing guide members to include two side guide shaft, axes of which lie in a plane orthogonal to the first optical axis, are parallel to the reference plane and substantially equi-distant from the reference plane. The anti-shake system further includes a third guide shaft, an axis of which lies in a plane orthogonal to the first optical axis and is parallel to the second reference plane. The third guide shaft is positioned on one side of the second reference plane and the second optical axis extends on the other side of the second reference plane in a direction away from the second reference plane. The movable member includes at least three slidable support portion, each of which holds an associated one of the side guide shafts and the third guide shaft from both sides thereof in a direction parallel to the first optical axis so that each of the slidable support portions is supported by the associated side guide shaft and third guide shaft to be slidable along the plane orthogonal to the first optical axis. As viewed along the first optical axis, the first permanent magnet, the second permanent magnet, the first coil and the second coil are arranged in a U-shaped area defined by the side guide shafts and the third guide shaft.

It is desirable for a combination of the first coil and the first magnet and a combination of the second coil and the second magnet are positioned on opposite sides of the reference plane, respectively.

According to the present invention, the front lens element of the front lens group, which is positioned in front of the prism of the front lens group, is moved in directions orthogonal to an optical axis (the first optical axis) to counteract image shake, which makes it possible to achieve miniaturization of the imaging apparatus in an efficient manner, even though an anti-shake system is incorporated, especially with respect to a reduction in thickness of the imaging apparatus in the forward/rearward direction along the first optical axis that passes through the front lens element. In addition, using at least two guide members, which are arranged along opposite sides of the prism of the front lens group as viewed along the first optical axis, as a supporter which supports the moving frame (which holds the front lens element) in a manner to allow the moving frame to move enhances space efficiency and contributes to miniaturization of the imaging apparatus that includes an anti-shake system.

The present disclosure relates to subject matter contained in Japanese Patent Application No. 2013-19480 (filed on Feb. 4, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
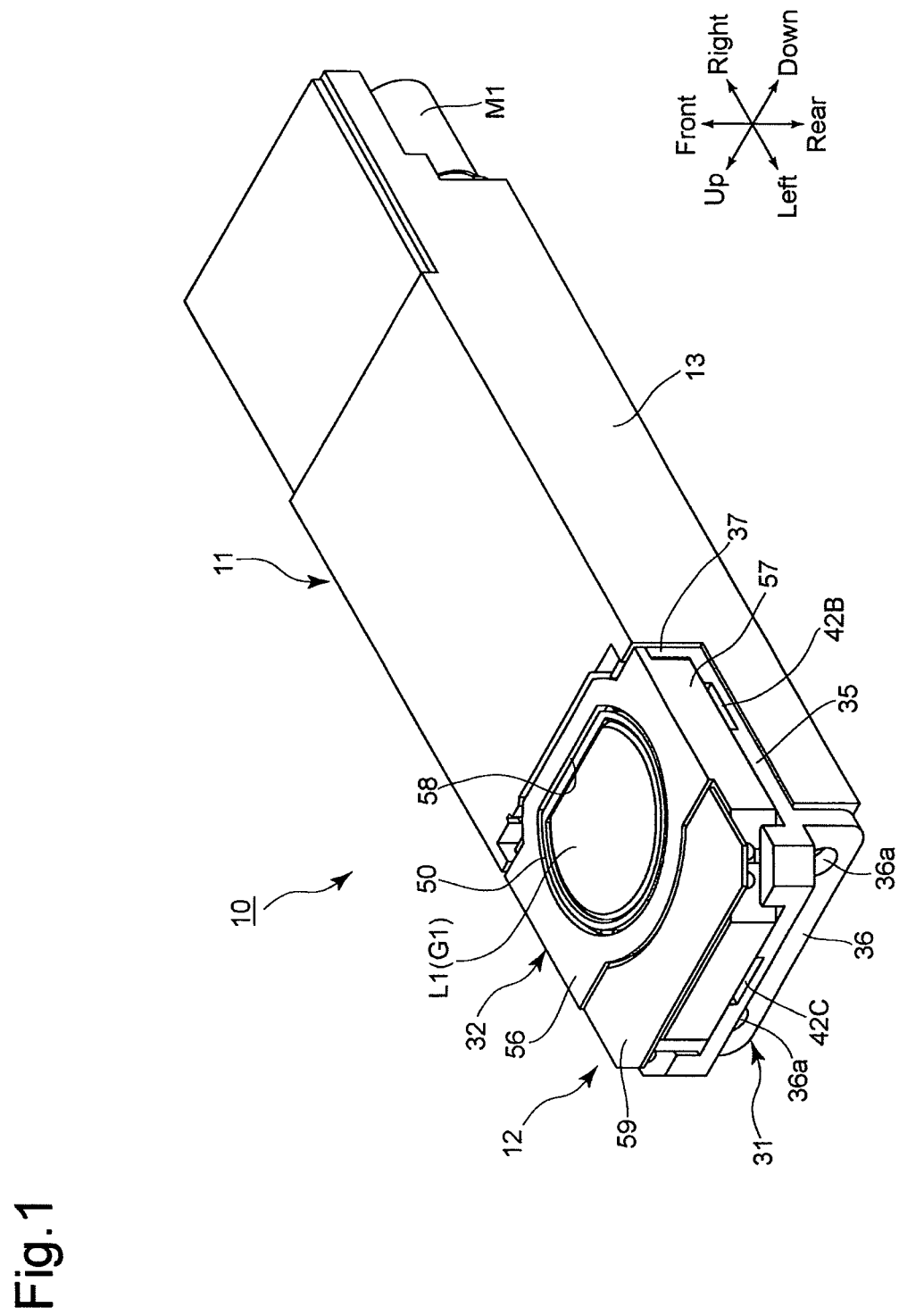
FIG. 1 is a perspective view of an embodiment of an imaging unit according to the present invention.

An embodiment of an imaging unit (imaging apparatus) 10 according to the present invention will be discussed below with reference to FIGS. 1 through 11. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIG. 1, the imaging unit 10 has a laterally elongated shape which is slim in the forward/rearward direction and long in the leftward/rightward direction.

Figure 2:
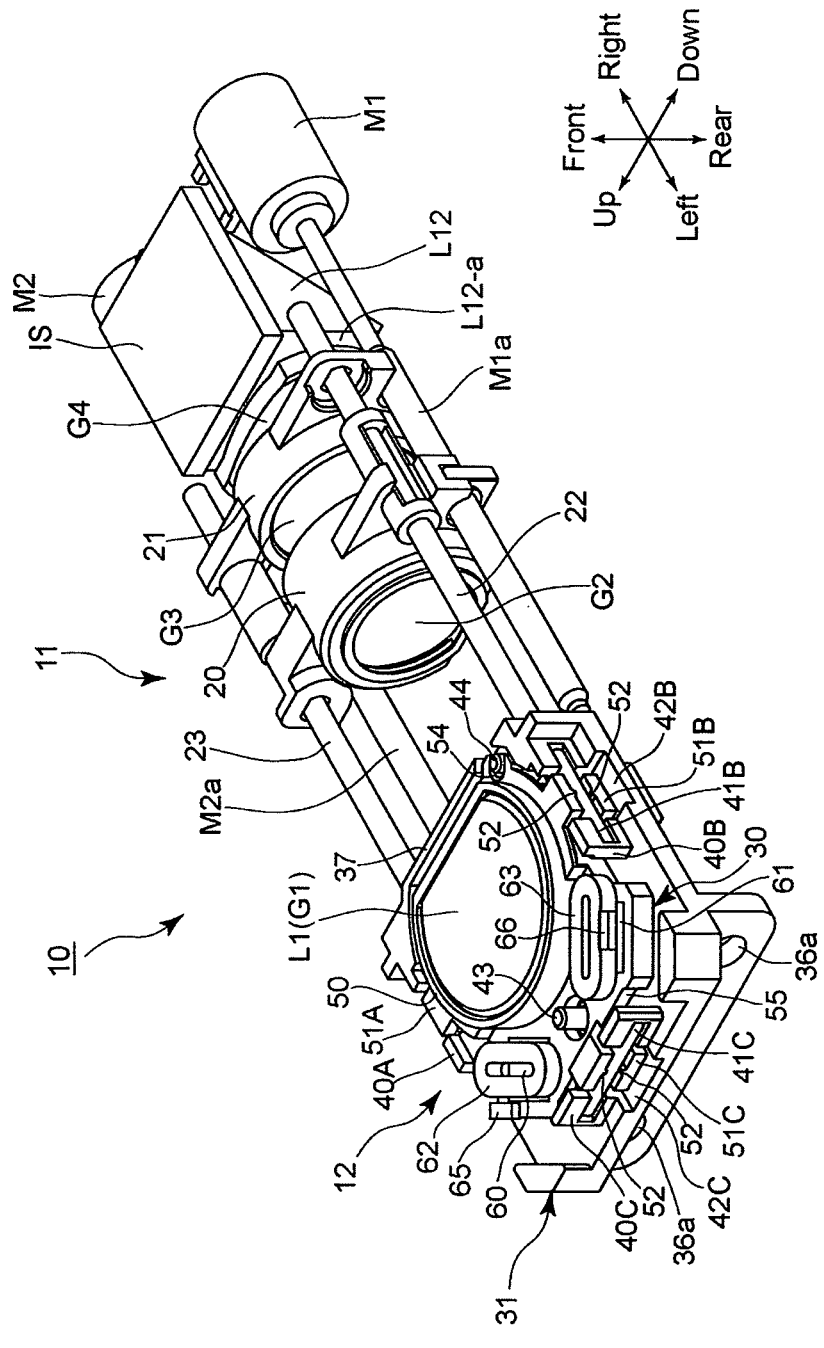
FIG. 2 is a perspective view of the imaging unit with the housing removed, illustrating the internal structure of the imaging unit.
Figure 3:
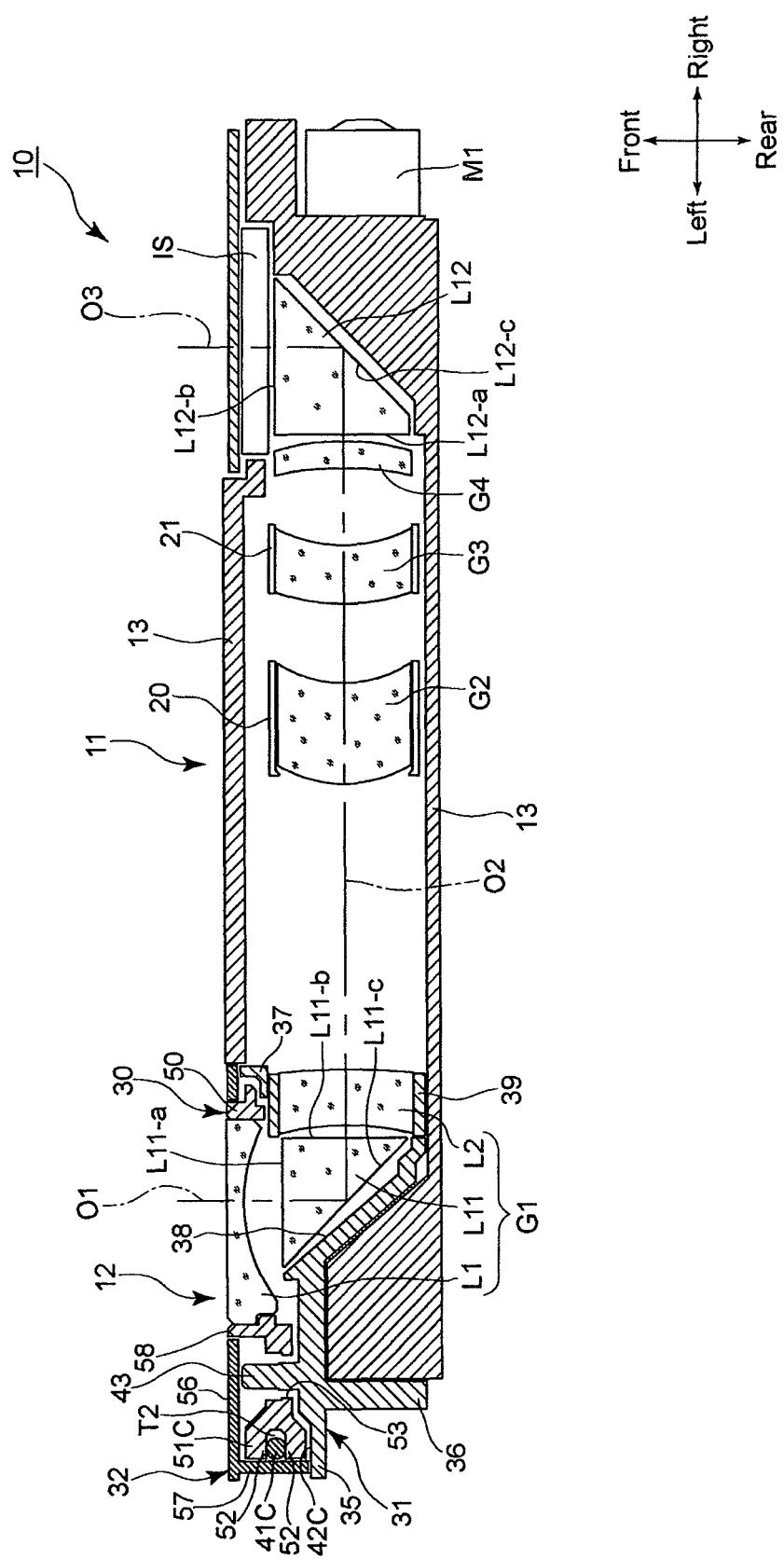
FIG. 3 is a transverse sectional view of the imaging unit.
Figure 7:
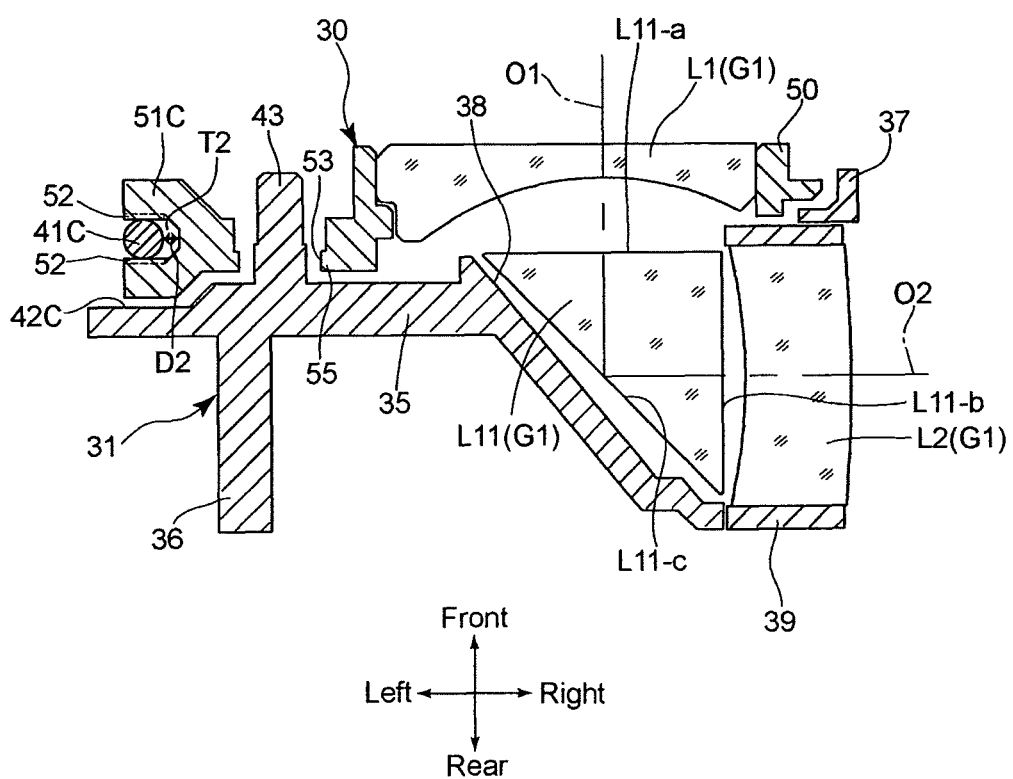
FIG. 7 is a sectional view taken along the line VII-VII shown in FIG. 5, illustrating the first lens-group unit.

As shown in FIGS. 2 and 3, an imaging optical system of the imaging unit 10 is provided with a first lens group (front lens group) G1, a second lens group (rear lens group) G2, a third lens group (rear lens group) G3 and a fourth lens group (rear lens group) G4. The first lens group G1 is provided with a first prism L11 and the imaging unit 10 is provided with a second prism L12 on the right-hand side (image plane side) of the fourth lens group G4. The imaging optical system of the imaging unit 10 is configured as a bending optical system which reflects (bends) light rays at substantially right angles at each of the first prism L11 and the second prism L12. As shown in FIGS. 3 and 7, the first lens group G1 is configured of a first lens element (front lens element) L1, the first prism L11 and a second lens element (rear lens element) L2. The first lens element L1 is positioned in front of (on the object side of) an incident surface L11-a of the first prism L11, while the second lens element L2 is positioned on the right-hand side (image plane side) of an exit surface L11-b of the first prism L11. Each of the second lens group G2, the third lens group G3 and the fourth lens group G4 is a lens group including no reflector element such as a prism.

As shown in FIG. 3, light rays emanated from the photographic object and incident on the first lens element L1 along a first optical axis O1 extending in the rearward direction from the front of the imaging unit 10 enter the first prism L11 through the incident surface L11-a and are reflected by a reflecting surface L11-c of the first prism L11 in a direction along a second optical axis O2 (extending in the rightward direction) to exit from the exit surface L11-b of the first prism L11. Subsequently, the light rays exiting from the exit surface L11-b pass through the second lens element L2 of the first lens group G1 and the second through fourth lens groups G2, G3 and G4, which lie on the second optical axis O2, and are incident on the second prism L12 through an incident surface L12-a thereof. Subsequently, the light rays which are passed through the incident surface L12a are reflected by a reflecting surface L12-c of the second prism L12 in a direction along a third optical axis O3 (extending in the forward direction) and are incident on the imaging surface of an image sensor IS to form an object image thereon. The first optical axis O1 and the third optical axis O3 are substantially parallel to each other and lie, together with the second optical axis O2, on a common plane. This (imaginary) common plane defines a first reference plane (reference plane) P1 (see FIGS. 5 and 6) in which the first optical axis O1, the second optical axis O2 and the third optical axis O3 lie, and an imaginary plane which is orthogonal to the first reference plane P1 and includes the first optical axis O1 is represented by a second reference plane P2 (see FIG. 5). The imaging unit 10 has a shape elongated in a direction along the second optical axis O2, and the first lens element L1 is positioned in the vicinity of an end (the left end) of the imaging unit 10 in the lengthwise direction thereof.

As shown in FIGS. 1 through 3, the imaging unit 10 is provided with a body module 11 which holds the second lens group G2, the third lens group G3, the fourth lens group G4, the second prism L12 and the imaging sensor IS, and a first lens-group unit 12 which holds the first lens group G1. The body module 11 is provided with a box-shaped housing 13 which is elongated in the leftward/rightward direction and is small in thickness (slim) in the forward/rearward direction. The first lens-group unit 12 is fixed to one end (the left end) of the housing 13 in the lengthwise direction thereof, and the fourth lens group G4, the second prism L12 and the imaging sensor IS are fixedly held at the other end (the right end) of the housing 13 in the lengthwise direction thereof.

As shown in FIG. 2, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 and a second motor M2 that are supported by the housing 13. When the first motor M1 is driven to rotate a screw shaft M1a thereof which projects from the body of the first motor M1, this rotation is transmitted to the second lens group frame 20 to move the second lens group frame 20 along the pair of rods 22 and 23. When the second motor M2 is driven to rotate a screw shaft M2a thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an anti-shake (image shake correction/image-stabilizing/shake reduction) system that reduces image shake on an image plane which is caused by vibrations such as hand shake. This anti-shake system drives the first lens element L1 of the first lens group G1 in a plane orthogonal to the first optical axis O1. The first optical axis O1 in the following descriptions and the drawings of the present embodiment of the imaging apparatus denotes the position of the first optical axis O1 in a state where the first lens element L1 is positioned at the center of the driving range thereof by the anti-shake system (i.e., at an initial optical-design position of the first lens element L1 when no image shake correction operation is performed).

Figure 4:
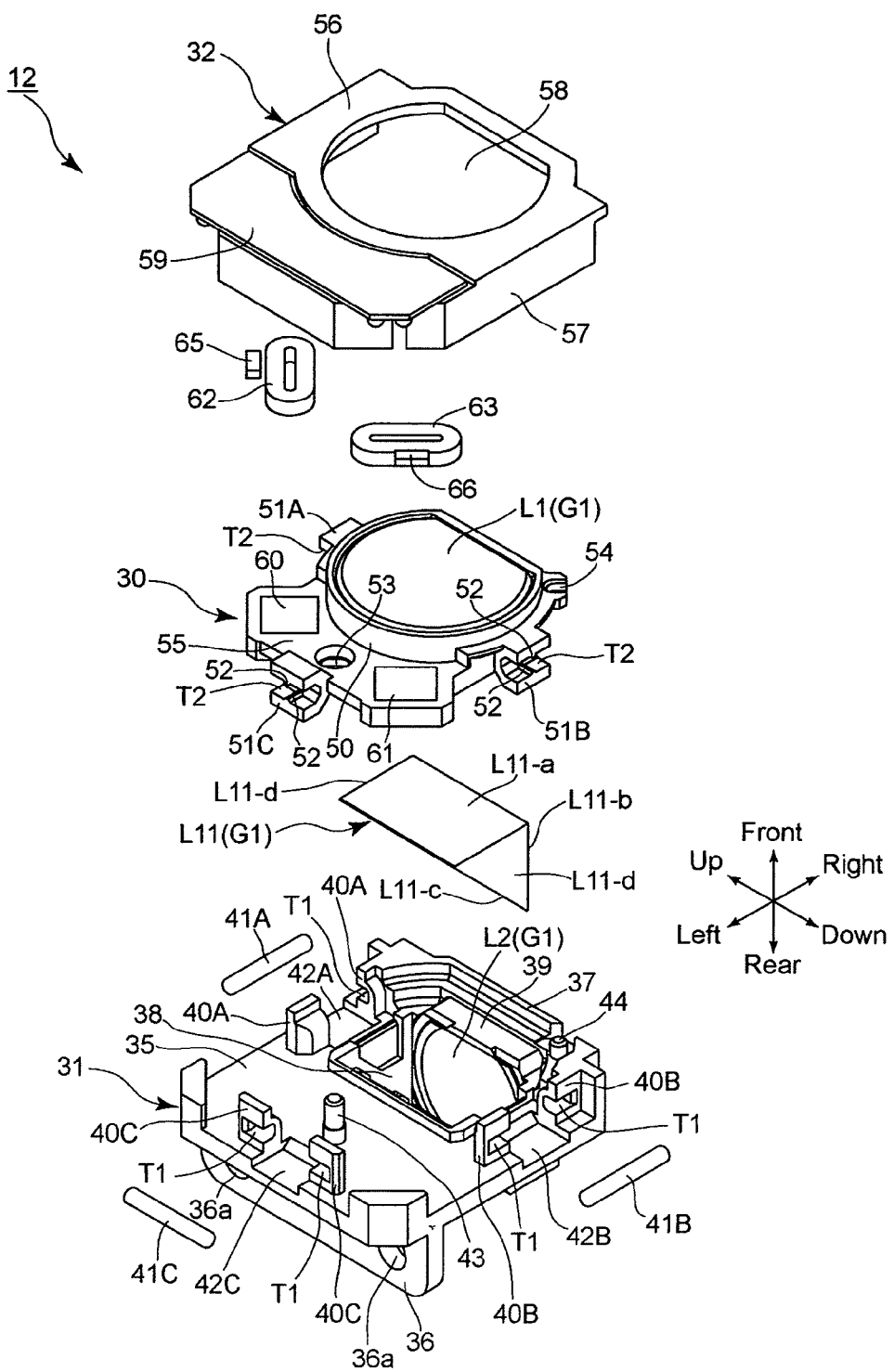
FIG. 4 is an exploded perspective view of a first lens-group unit of the imaging unit that constitutes a part of the imaging unit.
Figure 5:
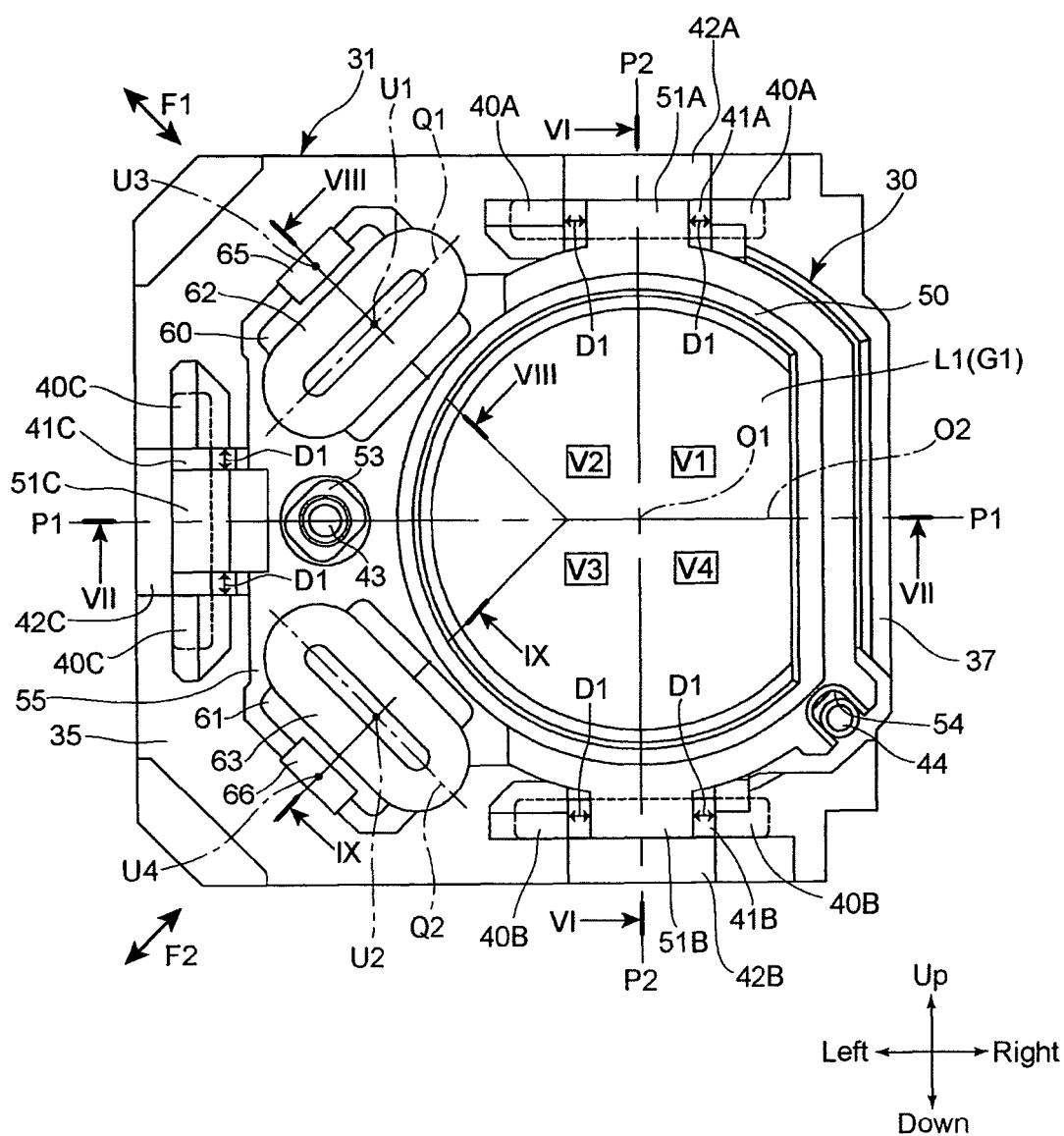
FIG. 5 is a front elevational view of the imaging unit with a covering member removed.
Figure 6:
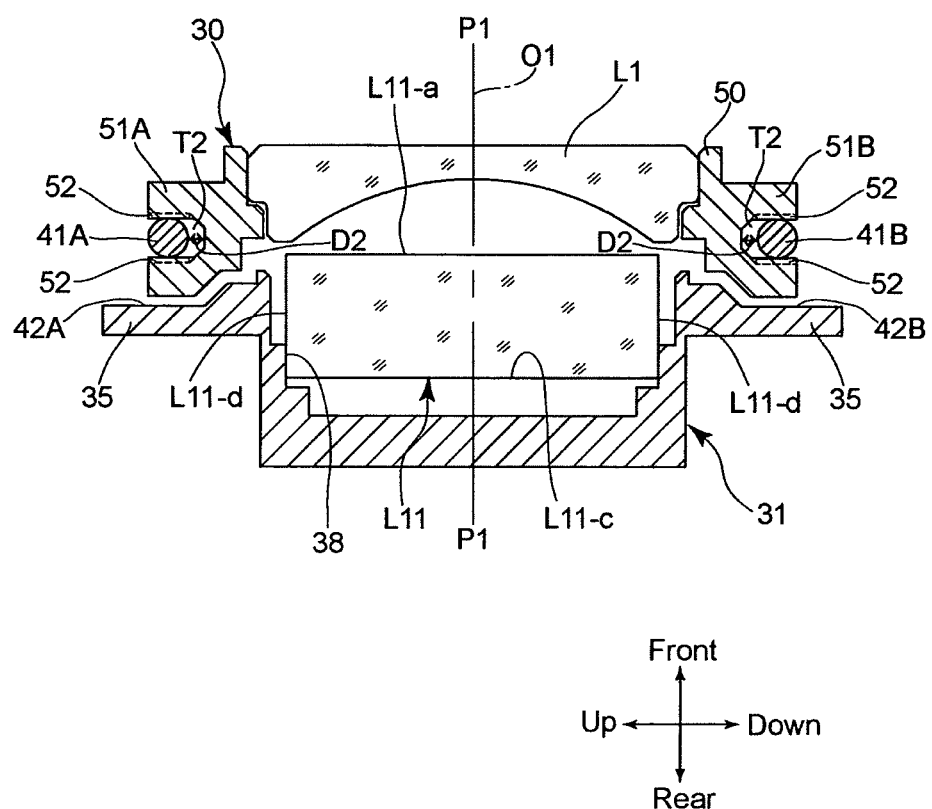
FIG. 6 is a sectional view taken along the line VI-VI shown in FIG. 5, illustrating the first lens-group unit.
Figure 11:
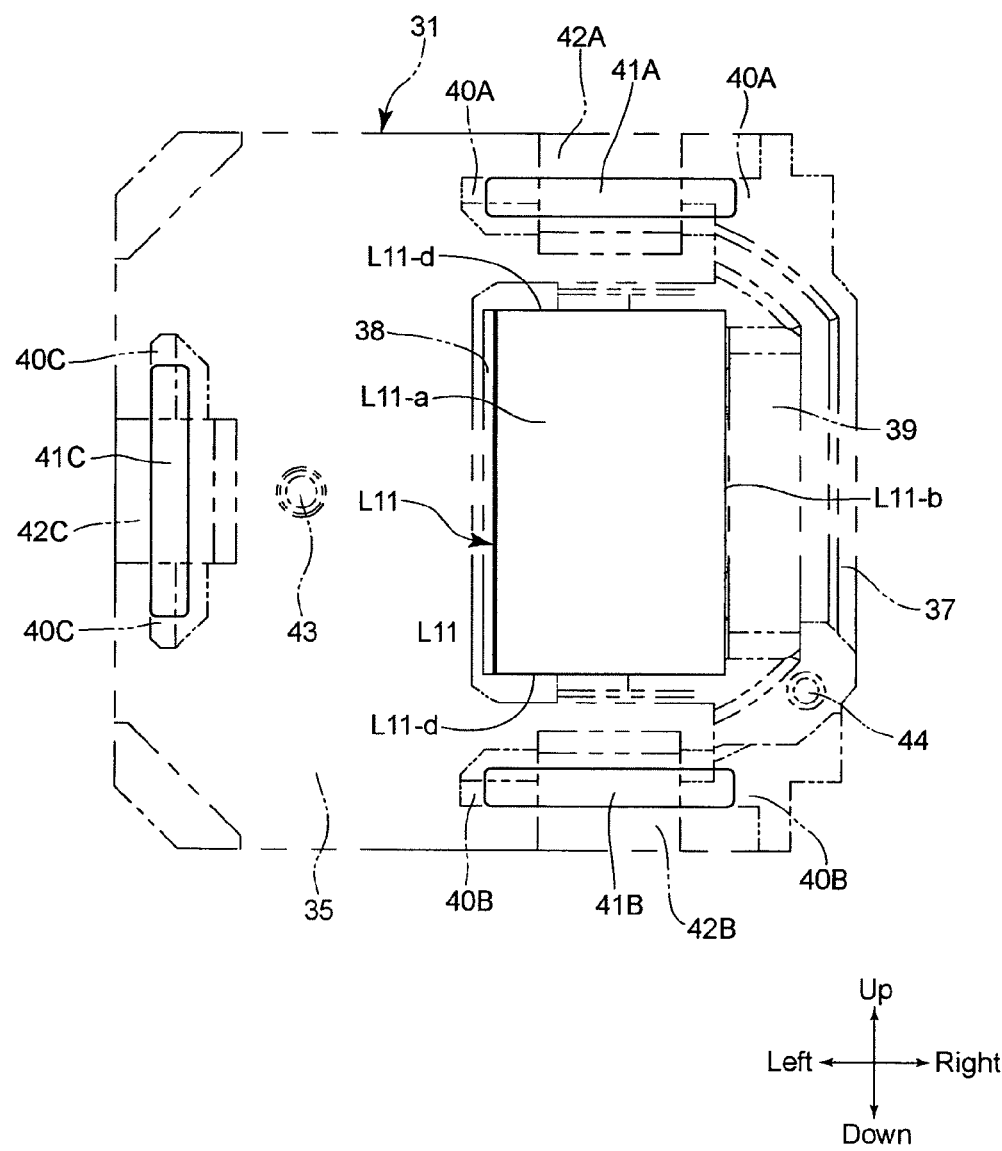
FIG. 11 is a front elevational view of a base member, and guide shafts and a first prism which are supported on the base member, viewed from the object side.

As shown in FIG. 4, the first lens-group unit 12 is provided with a first lens frame (movable frame) 30 which holds the first lens element L1, a base member 31 which holds the first prism L11 and the second lens element L2, and a cover member 32 which covers the first lens frame 30 and the base member 31 from front. The base member 31 is substantially rectangular in shape as viewed from front as shown in FIGS. 5 and 11 and is provided with a base plate 35, a rear flange 36 and an exit-side flange 37. As shown in FIGS. 4, 6 and 7, the base plate 35 lies in a plane substantially orthogonal to the first optical axis O1, the rear flange 36 projects rearward from the base plate 35, and the exit-side flange 37 is positioned at the right end of the base plate 35. The support position of the first lens-group unit 12 on the body module 11 is determined by making the rear flange 36 and the exit-side flange 37 abut against the housing 13 and by engaging ends of the pair of rods 22 and 23 in holes formed in the exit-side flange 37 (see FIGS. 1 and 3). The first lens-group unit 12 is fixed to the body module 11 by screwing set screws which are inserted into holes 36a (see FIGS. 1, 2 and 4) formed through the rear flange 36 of the base member 31, into screw holes (not shown) formed in the housing 13. The aforementioned set screws are not shown in the drawings.

As shown in FIGS. 3, 4, 6, 7 and 11, the base member 31 is provided with a prism mounting recess 38. The front side of the prism mounting recess 38 is open and exposed on the top of the base plate 35, while the right side of the prism mounting recess 38 is open and exposed toward the exit-side flange 37. The first prism L11 is fit-engaged into the prism mounting recess 38 and fixed thereto. The first prism L11 is provided with the incident surface L11-a, the exit surface L11-b, the reflecting surface L11-c and a pair of side surfaces L11-d. The incident surface L11-a is positioned on the first optical axis O1 and faces forward, the exit surface L11-b is positioned on the second optical axis O2 and faces rightward, the reflecting surface L11-c is positioned at an angle of substantially 45 degrees with respect to the incident surface L11-a and the exit surface L11-b, and the pair of side surfaces L11-d are substantially orthogonal to both the incident surface L11-a and the exit surface L11-b. The exit surface L11-b is substantially parallel to the second reference plane P2, and the pair of side surfaces L11-d are substantially parallel to the first reference plane P1. The base member 31 is further provided with a lens holding portion 39 which extends through the exit-side flange 37 in the rightward direction from the prism mounting recess 38, and the second lens element L2 is fit-engaged into the lens holding portion 39 to be held thereby.

Figure 10:
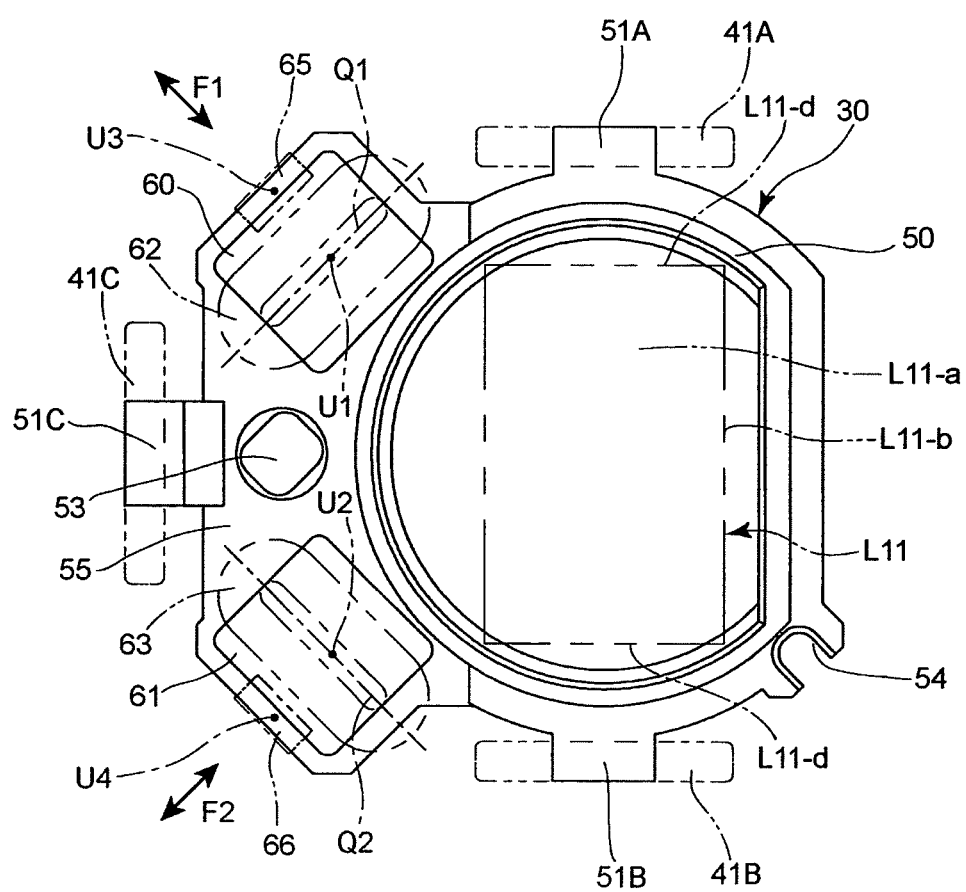
FIG. 10 is a front elevational view of a first lens frame that holds a first lens element of the imaging optical system of the imaging unit.

As shown in FIGS. 4, 10 and 11, the incident surface L11-a of the first prism L11 is in the shape of a non-square rectangle which is defined by two pairs of sides (two long sides and two short sides). The first prism L11 is positioned in the prism mounting recess 38 so that the long sides (a pair of opposite sides) of the incident surface L11-a extend upward and downward and that the short sides (another pair of opposite sides) of the incident surface L11-a extend leftward and rightward. In the following descriptions, the long side of the incident surface L11-a which adjoins the exit surface L11-b (and which constitutes the boundary between the incident surface L11-a and the exit surface L11-b) is referred to as the exit long-side of the incident surface L11-a, and the long side of the incident surface L11-a that is on the opposite side of the exit long-side and far from the exit surface L11-b (and which constitutes the boundary between the incident surface L11-a and the reflecting surface L11-c) is referred to as the end long-side of the incident surface L11-a. The pair of short sides of the incident surface L11-a, which connect the exit long-side and the end long-side of the incident surface L11-a, constitute the boundaries between the incident surface L11-a and the pair of side surfaces L11-d.

The base member 31 is provided on the front of the base plate 35 with three guide support portions 40A, 40B and 40C. As shown in FIGS. 5 and 11, the guide support portions 40A and 40B are arranged at positions along the pair of side surfaces L11-d (the pair of short sides of the incident surface L11-a) of the first prism L11 and are symmetrical with respect to the first reference plane P1, and the guide support portion 40C is positioned between the end long-side of the incident surface L11-a and the left end of the base member 31. In other words, the guide support portions 40A, 40B and 40C are formed in a U-shaped area along the three sides of the incident surface L11-a except for the exit long-side thereof. As shown in FIG. 4, each of the guide support portions 40A, 40B and 40C is U-shaped in cross section and has an elongated open groove T1 that is open toward the peripheral edge of the base member 31. The elongated open grooves T1 of the guide support portions 40A and 40B are elongated grooves which are elongated in a direction substantially parallel to the short sides of the incident surface L11-a of the first prism L11, and the elongated open groove T1 of the guide support portion 40C is an elongated groove which is elongated in a direction substantially parallel to the long sides of the incident surface L11-a of the first prism L11.

A guide shaft (one of two opposing guide members/side guide shaft) 41A, a guide shaft (the other of the two opposing guide members/side guide shaft) 41B and a guide shaft (third guide member/third guide shaft) 41C are inserted into and supported by the elongated open grooves T1 of the guide support portions 40A, 40B and 40C, respectively. The guide shafts 41A, 41B and 41C are cylindrical columnar members which have a uniform cross section in the lengthwise direction and are made of metal, synthetic resin or the like. The elongated open groove T1 of the guide support portion 40A is open on the upper side thereof, and the guide shaft 41A is inserted into the elongated open groove T1 of the guide support portion 40A in a direction to approach the first optical axis O1 from this upper-side opening that faces upward. The elongated open groove T1 of the guide support portion 40B is open on the lower side thereof, and the guide shaft 41B is inserted into the elongated open groove T1 of the guide support portion 40B in a direction to approach the first optical axis O1 from this lower-side opening that faces downward. The elongated open groove T1 of the guide support portion 40C is open on the left side thereof, and the guide shaft 41C is inserted into the elongated open groove T1 of the guide support portion 40C in a direction to approach the first optical axis O1 from this left-side opening that faces leftward. Each guide shaft 41A, 41B and 41C can be inserted into the associated elongated open groove T1 along a plane orthogonal to the first optical axis O1, and the axes of the guide shafts 41A, 41B and 41C lie in a plane orthogonal to the first optical axis O1 with each guide shaft 41A, 41B and 41C inserted into the associated elongated open groove T1. More specifically, as shown in FIGS. 5 and 11, the axes of the guide shafts 41A and the 41B are substantially parallel to the short sides (the pair of side surfaces L11-d) of the incident surface L11-a of the first prism L11 and the first reference plane P1, and the axis of the guide shaft 41A and the axis of the guide shaft 41B are substantially equi-distant from the first reference plane P1. In addition, the axis of the guide shaft 41C is substantially parallel to the long sides of the incident surface L11-a of the first prism L11 and the second reference plane P2. Furthermore, as shown in FIG. 5, the centers of the guide shafts 41A and 41B with respect to the axial direction thereof lie in the second reference plane P2, and the center of the guide shaft 41C with respect to the axial direction thereof lies in the first reference plane P1. Cutouts (recesses) 42A, 42B and 42C are formed in central portions of the guide support portions 40A, 40B and 40C, each of which has a shape so as not to hold the associated guide shaft 41A, 41B or 41C. The cutouts 42A and 42B are positioned on the second reference plane P2, and the cutout 42C is positioned on the first reference plane P1.

The base member 31 is provided on the front of the base plate 35 with a movement limit projection 43 and a swing pivot 44, each of which projects forward. As shown in FIGS. 4 and 11, the movement limit projection 43 is a cylindrical columnar projection which is formed between the prism mounting recess 38 (the end long-side of the incident surface L11-a of the prism L11) and the cutout 42C. The swing pivot 44 is a cylindrical columnar projection which is formed near the boundary between the guide support portion 40B and the exit-side flange 37 (in the vicinity of the corner between the lower short side of the incident surface L11-a and the exit long-side of the incident surface L11-a) in the vicinity of the prism mounting recess 38.

In the anti-shake system of the imaging unit 10, the first lens frame 30 is supported by the base member 31 to be movable in a plane orthogonal to the first optical axis O1 via the three guide shafts 41A, 41B and 41C. As shown in FIGS. 4 and 10, the first lens frame 30 is provided with a cylindrical lens holding portion 50, into which the first lens element L1 is fitted to be fixed thereto, and a flange 55 which projects in a direction (leftward direction) opposite to the direction of extension of the second optical axis O2. The first lens frame 30 is further provided around the lens holding portion 50 and the flange 55 with three slidable support portions 51A, 51B and 51C. As viewed from front as shown in FIGS. 5 and 10, the first lens element L1 has a D-cut shape that is formed (defined) by cutting off a portion of the outer edge of the first lens element L1 on the right side thereof (the side from which the second optical axis O2 extends rightward from the reflecting surface L11-c of the first prism L11), and the lens holding portion 50 has a D-cut cylindrical shape which corresponds in outside shape to the first lens element L1. The three slidable support portions 51A, 51B and 51C are formed on the first lens frame 30 along three sides thereof except for the side on which the D-cut portion is formed.

More specifically, the slidable support portions (side slidable support portions) 51A and 51B are formed on the periphery of the lens holding portion 50 to be symmetrical with respect to the first reference plane P1, and the slidable support portion (third slidable support portion) 51C is formed at the left end of the flange 55. In the state shown in FIGS. 5 through 7, in which the first lens frame 30 is supported by the base member 31, the slidable support portion 51A is positioned above the cutout 42A, the slidable support portion 51B is positioned above the cutout 42B and the slidable support portion 51C is positioned above the cutout 42C. The cutouts 42A, 42B and 42C serve as clearance recesses which prevent the guide support portions 40A, 40B and 40C from interfering with the slidable support portions 51A, 51B and 51C, respectively, when the first lens frame 30 moves relative to the base member 31 to perform an anti-shake operation.

As shown in FIGS. 4, 6 and 7, each of the three slidable support portions 51A, 51B and 51C is U-shaped in cross section and has an elongated open groove T2 that is open toward the peripheral edge of the first lens frame 30. The elongated open grooves T2 of the slidable support portions 51A and 51B are elongated grooves which are elongated in a direction substantially parallel to the short sides of the incident surface L11-a of the first prism L11, and the elongated open groove T2 of the slidable support portion 51C is an elongated groove which is elongated in a direction substantially parallel to the long sides of the incident surface L11-a of the first prism L11. The guide shaft 41A is inserted into the elongated open groove T2 of the slidable support portion 51A from the upper-side opening of this elongated open groove that faces upward, the guide shaft 41B is inserted into the elongated open groove T2 of the slidable support portion 51B from the lower-side opening of this elongated open groove that faces downward, and the guide shaft 41C is inserted into the elongated open groove T2 of the slidable support portion 51C from the left-side opening of this elongated open groove that faces leftward. In an assembly process, it is advisable that the base member 31 and the first lens frame 30 be combined together and thereafter each guide shaft 41A, 41B and 41C be inserted into the associated elongated open groove T1 and the associated elongated open groove T2. When the first lens frame 30 is mounted on the base member 31 with the slidable support portions 51A, 51B and 51C respectively aligned with the cutouts 42A, 42B and 42C, the elongated open grooves T2 of the slidable support portions 51A, 51B and 51C are positioned relative to the elongated open grooves T1 of the guide support portions 40A, 40B and 40C such that the elongated open grooves T1 are communicatively connected to, and coaxial with, the elongated open grooves T2, respectively (each elongated open groove T2 is positioned at the midpoint of the associated elongated open groove T1 in the elongated direction thereof). In this state, the guide shaft 41A is inserted into the elongated open groove T1 of the guide support portion 40A and the elongated open groove T2 of the slidable support portion 51A in a direction to approach the first optical axis O1 from the upper-side openings of these elongated open grooves T1 and T2 that face upward. Likewise, the guide shaft 41B is inserted into the elongated open groove T1 of the guide support portion 40B and the elongated open groove T2 of the slidable support portion 51B in a direction to approach the first optical axis O1 from the lower-side openings of these elongated open grooves T1 and T2 that face downward, and the guide shaft 41C is inserted into the elongated open groove T1 of the guide support portion 40C and the elongated open groove T2 of the slidable support portion 51C in a direction to approach the first optical axis O1 from the left-side openings of these elongated open grooves T1 and T2 that face leftward. Each guide shaft 41A, 41B and 41C inserted into the associated elongated open groove T1 is fixed, at both ends thereof, inside the associated elongated open groove T1 by an adhesive, press-fitting or the like, and held so as not to come off the associated elongated open groove T1 by an outer surrounding wall 57 of the cover member 32.

As shown in FIGS. 4, 6 and 7, each slidable support portion 51A, 51B and 51C is provided in the elongated open groove T2 thereof with a pair of projections 52 which face each other in a direction parallel to the first optical axis O1, and the pair of projections 52 of each slidable support portion 51A, 51B and 51C holds the associated guide shaft 41A, 41B or 41C therebetween from both sides thereof in a direction parallel to the first optical axis O1. Each pair of projections 52 project in opposite directions toward each other so as to partially narrow the width of the associated elongated open groove T2 in a direction parallel to the first optical axis O1 to hold the associated guide shaft 41A, 41B or 41C with substantially no clearance (specifically, with the presence of a minimum clearance allowing the associated slidable support portion 51A, 51B or 51C to slide on the associated guide shaft 41A, 41B or 41C). This structure prevents the first lens frame 30 from moving relative to the base member 31 in a direction along the first optical axis O1. As shown in FIG. 4, each projection 52 is trapezoidal in cross sectional shape, and the contact portion of each projection 52 which is in contact with the associated guide shaft 41A, 41B or 41C is formed as a flat surface (the upper base of a trapezoid) lying in a plane substantially orthogonal to the first optical axis O1. Accordingly, each projection 52 is slidable on the associated guide shaft 41A, 41B or 41C in a direction along a plane orthogonal to the first optical axis O1.

As shown in FIG. 5, a clearance D1 is provided on each of the opposite sides of each slidable support portion 51A, 51B and 51C in the sliding direction thereof with respect to the associated (adjacent) guide support portion 40A, 40B or 40C to allow each slidable support portion 51A, 51B and 51C to move in the axial direction of the associated guide shaft 41A, 41B or 41C. In addition, as shown in FIGS. 6 and 7, a clearance D2 is provided in the elongated open groove T2 of each slidable support portion 51A, 51B and 51C between the bottom of this elongated open groove T2 and the associated guide shaft 41A, 41B or 41C inserted therein to allow each slidable support portion 51A, 51B and 51C to move in the direction of depth of the elongated open groove T2 that is orthogonal to the axis of the associated guide shaft 41A, 41B or 41C. Namely, the slidable support portions 51A, 51B and 51C are supported to be movable along a plane orthogonal to the first optical axis O1 via the guide shafts 41A, 41B and 41C, respectively, that are fixedly supported on the base member 31.

The flange 55 of the first lens frame 30 is provided with a movement limit hole 53 which is formed through the flange 55 in the forward/rearward direction and into which the movement limit projection 43 of the base member 31 is inserted. As shown in FIGS. 5 and 10, the inner wall of the movement limit hole 53 is generally rectangular in shape in a plane substantially orthogonal to the first optical axis O1. The first lens frame 30 can move relative to the base member 31 within a range until the movement limit projection 43 comes into contact with the inner wall of the movement limit hole 53. The aforementioned clearances D1 and D2 that are set in each slidable support portion 51A, 51B and 51C are set to be greater than the moving range of the first lens frame 30 that is allowed by the movement limit hole 53 and the movement limit projection 43, and the moving range of the first lens frame 30 relative to the base member 31 is determined by the movement limit projection 43 and the movement limit hole 53.

The first lens frame 30 is further provided with a pivot support groove 54 in which the swing pivot 44 of the base member 31 is engaged. The pivot support groove 54 is an elongated groove which is elongated in a radial direction which centers on the first optical axis O1 and exposed radially outwards, toward the outer periphery of the first lens frame 30. As shown in FIG. 5, the pivot support groove 54 is engaged with the swing pivot 44 with a clearance allowing the pivot support groove 54 to move relative to the swing pivot 44 in the lengthwise (depthwise) direction of the pivot support groove 54, and the pivot support groove 54 is prevented from moving relative to the swing pivot 44 in a direction orthogonal to the lengthwise direction of the pivot support groove 54. Although the first lens frame 30 is supported by the base member 31 to be movable in a plane orthogonal to the first optical axis O1 due to the sliding engagement of the three guide shafts 41A, 41B and 41C with the slidable support portions 51A, 51B and 51C as mentioned above, the moving direction of the first lens frame 30 in the aforementioned orthogonal plane is defined by the engagement of the swing pivot 44 with the pivot support groove 54. Specifically, the first lens frame 30 is supported by the base member 31 to be allowed to move in the rotational (swinging) direction about the swing pivot 44 and the lengthwise direction of the pivot support groove 54.

The movement limit projection 43 and the swing pivot 44 are inserted into the movement limit hole 53 and the pivot support groove 54, respectively, at the stage at which first lens frame 30 is mounted on the base member 31 before the installation of the guide shafts 41A, 41B and 41C.

As shown in FIG. 4, the cover member 32 is provided with a plate-shaped front wall 56 that is orthogonal to the first optical axis O1 and the outer surrounding wall 57 that projects rearward from the front wall 56. The cover member 32 is fixed to the base member 31 so that the front wall 56 covers the first lens frame 30 from front. In this fixed state, the outer surrounding wall 57 is a U-shaped wall which surrounds the three guide support portions 40A, 40B and 40C of the base member 31 from the outer side, and the side openings of the elongated open grooves T1 of the guide support portions 40A, 40B and 40C and the side openings of the elongated open grooves T2 of the slidable support portions 51A, 51B and 51C are all closed by the outer surrounding wall 57 (see FIG. 3). The front wall 56 is provided with a photographic aperture 58 through which the first lens element L1 is exposed forward.

The first lens frame 30 is driven by an electromagnetic actuator. This electromagnetic actuator includes two voice coil motors (VCMs) provided with two permanent magnets 60 and 61 and two coils 62 and 63, respectively.

The two permanent magnets 60 and 61 are supported by the first lens frame 30 and the two coils 62 and 63 are supported by the cover member 32. The permanent magnets 60 and 61 are fitted into and held by magnet holding holes formed in the flange 55 of the first lens frame 30 (see FIGS. 8 and 9). Each of the permanent magnets 60 and 61 is in the shape of a non-square rectangular thin plate. The permanent magnets 60 and 61 are arranged symmetrically with respect to the first reference plane P1. More specifically, opposite sides of a magnetic pole boundary line Q1 (see FIGS. 5 and 10) of the permanent magnet 60, which extends in the lengthwise direction thereof and passes through an approximate center of the permanent magnet 60 with respect to the width thereof, are magnetized into north and south poles, respectively, while opposite sides of a magnetic pole boundary line Q2 (see FIGS. 5 and 10) of the permanent magnet 61, which extends in the lengthwise direction thereof and passes through an approximate center of the permanent magnet 61 with respect to the width thereof, are magnetized into north and south poles, respectively. In other words, the magnetic pole boundary line Q1 defines a boundary between north and south poles of the permanent magnet 60, while the magnetic pole boundary line Q2 defines a boundary between north and south poles of the permanent magnet 61. The magnetic pole boundary line Q1 of the permanent magnet 60 and the magnetic pole boundary line Q2 of the permanent magnet 61 are inclined to each other so that the distance therebetween (i.e., the distance from the first reference plane P1) gradually increases in a direction from left to right. The inclination angles of the magnetic pole boundary lines Q1 and Q2 of the permanent magnets 60 and 61 with respect to the first reference plane P1 are set to approximately ±45 degrees, respectively. Namely, the lengthwise directions (the magnetic pole boundary lines Q1 and Q2) of the permanent magnets 60 and 61 are substantially orthogonal to each other.

Figure 8:
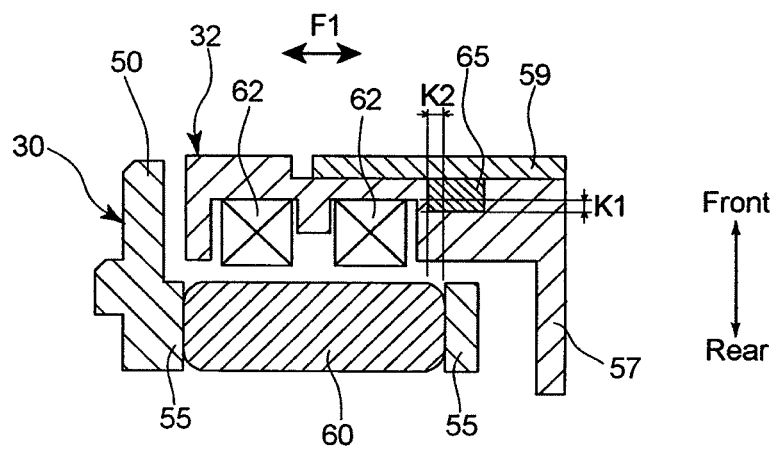
FIG. 8 is a sectional view taken along the line VIII-VIII shown in FIG. 5, illustrating a portion of an electromagnetic actuator provided in the first lens-group unit, and the vicinity thereof, with the covering member mounted.
Figure 9:
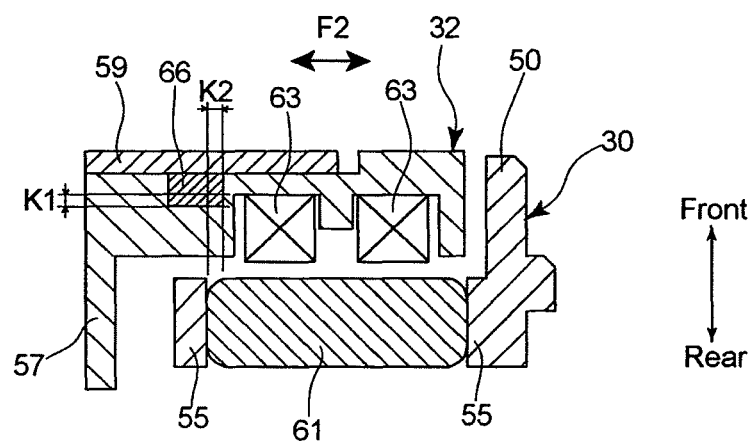
FIG. 9 is a sectional view taken along the line IX-IX shown in FIG. 5, illustrating another portion of the electromagnetic actuator, and the vicinity thereof, with the covering member mounted.

As shown in FIG. 4, a circuit board 59 is fixed to a portion of the front wall 56 of the cover member 32 which does not overlap the photographic aperture 58. As shown in FIGS. 8 and 9, the coils 62 and 63 that constitute elements of the electromagnetic actuator are fixed to the rear of the front wall 56 and electrically connected to the circuit board 59. As shown in FIGS. 5 and 10, each of the coils 62 and 63 is an air-core coil which includes a pair of linear portions that are substantially parallel to each other and a pair of curved (U-shaped) portions which connect the pair of linear portions at the respective ends thereof. The coils 62 and 63 are substantially identical in shape and size to each other and are symmetrically arranged with respect to the first reference plane P1. Specifically, in a state where the first lens element L1 is positioned at the center of the driving range thereof by the anti-shake system (i.e., at an initial optical-design position of the first lens element L1 when no image shake correction operation is performed), the long axis (major axis) of the coil 62, which is parallel to the linear portions of the coil 62 and passes through the air core of the coil 62, and the long axis (major axis) of the coil 63, which is parallel to the linear portions of the coil 63 and passes through the air core of the coil 63, correspond to the magnetic pole boundary line Q1 of the permanent magnet 60 and the magnetic pole boundary line Q2 of the permanent magnet 61, respectively, as viewed from front as shown in FIGS. 5 and 10. In other words, the coils 62 and 63 are arranged to be inclined to each other so that the distance between the long axis of the coil 62 and the long axis of the coil 63 gradually increases in a direction from left to right, similar to the permanent magnets 60 and 61. The inclination angles of the long axes of the coils 62 and 63 with respect to the first reference plane P1 are set to approximately ±45 degrees, respectively. Namely, the lengthwise directions (the long axes) of the coils 62 and 63 are substantially orthogonal to each other.

The energization of the coils 62 and 63 is controlled via the circuit board 59. A driving force is generated in a direction substantially orthogonal to the magnetic pole boundary line Q1 of the permanent magnet 60 (i.e., orthogonal to the direction of the long axis of the coil 62) in a plane orthogonal to the first optical axis O1 upon the coil 62 being energized. The direction of action of this driving force is shown by a double-headed arrow F1 in FIGS. 5, 8 and 10. On the other hand, a driving force is generated in a direction substantially orthogonal to the magnetic pole boundary line Q2 of the permanent magnet 61 (i.e., orthogonal to the direction of the long axis of the coil 63) in a plane orthogonal to the first optical axis O1 upon the coil 63 being energized. The direction of action of this driving force is shown by a double-headed arrow F2 in FIGS. 5, 9 and 10. The direction of action F1 of the driving force generated by energizing the coil 62 is substantially parallel to the lengthwise direction of the pivot support groove 54, and the first lens frame 30 can move linearly along the lengthwise direction of the pivot support groove 54 relative to the base member 31 upon the coil 62 being energized. On the other hand, the direction of action F2 of the driving force generated by energizing the coil 63 is substantially orthogonal to the lengthwise direction of the pivot support groove 54, and the pivot groove 54 is prevented from moving relative to the swing pivot 44 in this orthogonal direction, and accordingly, the first lens frame 30 rotates (swings) about the swing pivot 44 relative to the base member 31 of the first lens frame 30 upon the coil 63 being energized. The first lens frame 30 can be moved to any arbitrary position in a plane orthogonal to the first optical axis O1 with respect to the base member 31 by a combination of controlling the passage of current through the coils 62 and 63. As described above, the moving range of the first lens frame 30 with respect to the base member 31 is limited by engagement of the movement limit projection 43 with the inner wall of the movement limit hole 53.

Reference character U1 shown in FIGS. 5 and 10 designates the centers of the permanent magnet 60 and the coil (the centers of the outer shapes thereof) in a plane orthogonal to the first optical axis O1. Likewise, reference character U2 shown in FIGS. 5 and 10 designates the centers of the permanent magnet 61 and the coil 63 (the centers of the outer shapes thereof) in a plane orthogonal to the first optical axis O1. The center U1 of the permanent magnet 60 corresponds to both the center of the permanent magnet 60 in the lengthwise (long-side) direction thereof along the magnetic pole boundary line Q1 and the center of the permanent magnet 60 in the short-side direction thereof that is orthogonal to the magnetic pole boundary line Q1. The center U2 of the permanent magnet 61 corresponds to both the center of the permanent magnet 61 in the lengthwise (long-side) direction thereof along the magnetic pole boundary line Q2 and the center of the permanent magnet 61 in the short-side direction thereof that is orthogonal to the magnetic pole boundary line Q2. The center U1 of the coil 62 corresponds to both the center of the coil 62 in the lengthwise (long-side) direction thereof along the long axis of the coil 62 and the center of the coil 62 in the short-side direction thereof that is orthogonal to the long axis of the coil 62. The center U2 of the coil 63 corresponds to both the center of the coil 63 in the lengthwise (long-side) direction thereof along the long axis of the coil 63 and the center of the coil 63 in the short-side direction thereof that is orthogonal to the long axis of the coil 63. FIGS. 5 and 10 each show a state where the first lens frame 30 is positioned at the center of the moving range thereof, which is mechanically defined (limited) by the movement limit projection 43 and the movement limit hole 53. When the first lens frame 30 is positioned at the center of the moving range thereof, the center U1 of the permanent magnet 60 and the center U1 of the coil 62 are coincident with each other (i.e., the center U1 of the permanent magnet 60 and the center U1 of the coil 62 are aligned in the forward/rearward direction), and the center U2 of the permanent magnet 61 and the center U2 of the coil 63 are coincident with each other (i.e., the center U2 of the permanent magnet 61 and the center U2 of the coil 63 are aligned in the forward/rearward direction). A movement of the first lens frame 30 which is caused by the passage of current through the coils 62 and 63 causes the positions of the centers U1 and U2 of the permanent magnets 60 and 61 with respect to the centers U1 and U2 of the coils 62 and 63 to change, respectively.

In addition, two magnetic sensors 65 and 66 are mounted to and supported by the rear of the front wall 56 of the cover member 32 as shown in FIGS. 8 and 9. Each of the two magnetic sensors 65 and 66 is composed of a Hall sensor connected to the circuit board 59. As viewed from front as shown in FIGS. 5 and 10, the magnetic sensor 65 is disposed on the opposite side of the coil 62 in the direction of action F1 from the first lens element L1 side (on the side farther from the first optical axis O1) to be adjacent to the linear portion of the coil 62, and the magnetic sensor 65 and the coil 62 overlap each other as viewed in the direction of action F1 (see FIG. 8). Additionally, as viewed from front as shown in FIGS. 5 and 10, the magnetic sensor 66 is disposed on the opposite side of the coil 63 in the direction of action F2 from the first lens element L1 side (on the side farther from the first optical axis O1) to be adjacent to the linear portion of the coil 63, and the magnetic sensor 66 and the coil 63 overlap each other as viewed in the direction of action F2 (see FIG. 9). The reference character K1 shown in FIG. 8 designates the overlapping range between the magnetic sensor 65 and the coil 62 and the reference character K1 shown in FIG. 9 designates the overlapping range between the magnetic sensor 66 and the coil 63.

When the cover member 32 is mounted to the base member 31, the magnetic sensors 65 and 66 are positioned in the vicinity of the permanent magnets 60 and 61, respectively. As shown in FIGS. 8 and 9, the magnetic sensors 65 and 66 are positioned in front of the permanent magnets 60 and 61, respectively, in the forward/rearward direction of the imaging unit 10 along the first optical axis O1. As shown in FIG. 8, in the direction of action F1, the width of the permanent magnet 60 in the short-side direction thereof is greater than the width of the coil 62 in the short-side direction thereof so that both ends of the permanent magnet 60 project from both ends of the coil 62 in the direction of action F1, and one of the projecting ends of the permanent magnet 60 which is farther from the first optical axis O1 (farther from the first lens element L1) (i.e., the right end of the permanent magnet 60 with respect to FIG. 8) and the magnetic sensor 65 overlap each other as viewed from the front. As shown in FIG. 9, in the direction of action F2, the width of the permanent magnet 61 in the short-side direction thereof is greater than the width of the coil 63 in the short-side direction thereof so that both ends of the permanent magnet 61 project from both ends of the coil 63 in the direction of action F2, and one of the both projecting ends of the permanent magnet 61 which is farther from the first optical axis O1 (farther from the first lens element L1) (i.e., the left end of the permanent magnet 61 with respect to FIG. 9) and the magnetic sensor 66 overlap each other as viewed from front. The reference character K2 shown in FIG. 8 designates the overlapping range between the magnetic sensor 65 and the permanent magnet 60 and the reference character K2 shown in FIG. 9 designates the overlapping range between the magnetic sensor 66 and the permanent magnet 61.

As shown in FIGS. 5 and 10, each of the two magnetic sensors 65 and 66 has a narrow rectangular shape in a front orthographic projection, and the reference characters U3 and U4 shown in FIGS. 5 and 10 designate the centers of the magnetic sensors 65 and 66 in a plane orthogonal to the first optical axis O1, respectively. The lengthwise direction of the magnetic sensor 65 is substantially parallel to the magnetic pole boundary line Q1 and the lengthwise direction of the magnetic sensor 66 is substantially parallel to the magnetic pole boundary line Q2. As shown in FIG. 5, a straight line that passes through the center U3 of the magnetic sensor 65 and extends in the direction of action F1 of the driving force caused by the permanent magnet 60 and the coil 62 and a straight line that passes through the center U4 of the magnetic sensor 66 and extends in the direction of action F2 of the driving force caused by the permanent magnet 61 and the coil 63 intersect each other on the first reference plane P1. Due to this arrangement, variation in position of the permanent magnet 60 in accordance with movement of the first lens frame 30 that is caused by the electromagnetic actuator causes the output of the magnetic sensor 65 to vary, and variation in position of the permanent magnet 61 in accordance with movement of the first lens frame 30 that is caused by the electromagnetic actuator causes the output of the magnetic sensor 66 to vary. Hence, the position of the first lens frame 30 can be detected from the output variations of the two magnetic sensors 65 and 66. Upon start-up of the imaging unit 10, the calibration of each magnetic sensor 65 and 66 is performed by driving the first lens frame 30 to a moving end thereof defined by the movement limit projection 43 and the movement limit hole 53.

If the imaging unit 10, which is completely assembled by mounting the first lens-group unit 12 that has the above described structure to the body module 11, is directed toward an object located in front of the imaging unit 10, light reflected by the object (light emanating from a photographic object) enters the first prism L11 through the incident surface L11-a after passing through the first lens element L1 and is reflected at an angle of 90 degrees by the reflecting surface L11-c of the first prism L11 and travels toward the exit surface L11-b. Subsequently, the reflected light that emerges from the exit surface L11-b of the first prism L11 enters the second prism L12 from the incident surface L12-a after passing through the second lens element L2, the second lens group G2, the third lens group G3 and the fourth lens group G4, and is reflected at an angle of 90 degrees by the reflecting surface L12-c of the second prism L12 and travels toward the exit surface L12-b. Subsequently, the reflected light emerges from the exit surface L12-b and is captured (received) by the imaging surface of the image sensor IS. A zooming operation of the imaging optical system of the imaging unit 10 is performed by moving the second lens group G2 and the third lens group G3 along the pair of rods 22 and 23 using the first motor M1 and the second motor M2. A focusing operation of the imaging optical system of the imaging unit 10 is performed by moving the third lens group G3 along the pair of rods 22 and 23 using the second motor M2. By performing these zooming and focusing operations, focused object images can be captured at selected angle of view.

Additionally, in the imaging unit 10, an anti-shake (image shake correction/image-stabilizing/shake reduction) operation is performed using the first lens element L1 of the first lens group G1 that is positioned in front of the first prism L11. As described above, the anti-shake system supports the first lens frame 30 in a manner to allow the first lens frame 30 to move relative to the base member 31, which is fixed with respect to the housing 13, in a plane orthogonal to the first optical axis O1 and drives the first lens frame 30 using the electromagnetic actuator.

The moving direction of the first lens element L1 during an anti-shake operation is orthogonal to the first optical axis O1. Namely, the first lens frame 30 that holds the first lens element L1 does not move in the forward/rearward direction that corresponds to the direction of the thickness of the imaging unit 10. In addition, the support mechanism (which includes the guide support portions 40A, 40B and 40C, the guide shafts 41A, 41B and 41C, the cutouts 42A, 42B and 42C, the movement limit projection 43, the swing pivot 44, the slidable support portions 51A, 51B and 51C, the movement limit hole 53, the pivot support groove 54, etc.) and the driver (which includes the permanent magnets 60 and 61, the coils 62 and 63, etc.) that are for moving the first lens frame 30 relative to the base member 31 are arranged at positions about the first optical axis O1 which surround the first lens element L1, so that the installation space for the support mechanism and the driver is small with respect to the forward/rearward direction of the imaging unit 10. Accordingly, the selection of the first lens element L1 as an anti-shake optical element makes it possible to slim down the imaging unit 10 in the forward/rearward direction even though the imaging unit 10 is provided with an anti-shake system. For instance, unlike the present embodiment, if an anti-shake system were to move the second lens group G2 or the third lens group G3 in directions orthogonal to the second optical axis O2 to cancel out image shake, securing room for the second lens group frame 20 or the third lens group frame 21 and installing the driver for the second lens group frame 20 or the third lens group frame 21 would require a greater installation space for the anti-shake system in the housing 13 in the forward/rearward direction than in the case of the above described illustrated embodiment, thus increasing the thickness of the imaging unit 10.

The first lens element L1 that is supported by the first lens frame 30 does not need to be connected to any circuit board, unlike an electrical component such as the imaging sensor IS, so that the structure of the imaging unit 10 does not become complicated due to routing of a flexible wiring board, or a flexible wiring board does not exert resistance on the first lens element L1 during an anti-shake operation. For instance, unlike the present embodiment, if the anti-shake system were to move the image sensor IS in directions orthogonal to the third optical axis O3 to cancel out image shake, the flexible wiring board to which a circuit board and the imaging sensor IS are connected is required to have a sufficient length so as not to provide resistance to movement of the image sensor IS; however, there is not much space around the image sensor IS, so that the flexible wiring board would interfere with other members if the flexible wiring board is made long. If the image sensor IS and the circuit board are spaced from each other in the forward/rearward direction in order to prevent this problem from occurring, this spacing conflicts with the slimming down of the imaging unit 10.

The selection of the first lens element L1 as an anti-shake optical element avoids the above described problems and makes it possible to achieve a simple anti-shake system which contributes to the slimming down of the imaging unit 10. Since only the first lens element L1 is driven during the anti-shake control, rather than the entire first lens group G1, there is the advantage of the moving parts of the anti-shake system being able to be provided in a compact manner and the driving load thereon can be small. In typical anti-shake systems, if only a part (e.g., one lens element) of a lens group is driven in directions orthogonal to the optical axis thereof, there is a possibility of aberrations in the imaging optical system increasing (thereby deteriorating the optical performance of the imaging optical system) and thus causing the imaging optical system to become impractical to use. In this connection, since the first prism L11 that functions only to reflect the incident light rays is disposed between the first lens element L1 and the second lens element L2 (that are optical elements having refractive powers) in the first lens group G1 in the present embodiment, the distance between the first lens element L1 and the second lens element L2 is great, so that an increase in aberration is reduced (deterioration of the optical performance of the imaging optical system is minimalized) even if the first lens element L1 is solely moved to perform anti-shake control. Accordingly, a satisfactory optical performance can be secured for an anti-shake operation even if the first lens element L1 and the second lens element L2, which are spaced far from each other in the optical axis direction with the first prism L11 positioned therebetween, are treated as different lens groups, even though the aberration is controlled over the entire first lens group G1, which includes the first lens element L1, the first prism L11 and the second lens element L2, in an imaging optical system; hence, only the first lens element L1 is set as an optical element used for anti-shake operation in the present embodiment.

Unlike telescopic lens barrels in which the length in an optical axis direction (the distance between the image plane and the lens element closest to the object side) varies when a zooming operation or a barrel retracting operation is performed, the length of the optical path from the incident surface of the first lens element L1 to the image plane (the imaging surface of the image sensor IS) in the imaging unit 10 is constant at all times. Therefore, it is possible to embed the imaging unit 10 into a mobile electronic device and cover the front of the first lens element L1 with a protection glass or the like, and no practical problem arises even if the first lens element L1 of the optical system of the imaging unit 10, which is located closest to the object side, is driven to cancel out image shake.

As mentioned above, even though only a part of a lens group is driven in the above described structure, in which the first lens element L1, which is an element of the first lens group LG1 and positioned in front of the first prism L11, is solely driven to reduce image shake, such a configuration does not easily influence the aberrations of the imaging optical system. However, since the first lens element L1 is required to have a higher operating accuracy than that of an anti-shake system in which an entire lens group is driven to reduce image shake, it is required to precisely support and drive the first lens frame 30, which holds the first lens element L1, to stabilize the anti-shake performance and the optical performance. Additionally, in regard to the driving of the first lens element L1 to reduce image shake, which is the greatest in diameter among all the lens elements of the imaging optical system, it is required to make the anti-shake system as compact as possible so as to contribute to miniaturization of the imaging unit. Features of this anti-shake system will be described hereinafter.

When four quadrants V1, V2, V3 and V4 which can be divided into four by the first reference plane P1 and the second reference plane P2 are set in a front view as shown in FIG. 5 on the premise of the following descriptions, the first quadrant V1 and the fourth quadrant V4 are positioned on a side of the second reference plane P2 (the right side of the second reference plane P2 with respect to FIG. 5) toward the light-ray travelling direction along the second optical axis O2 upon the light rays being reflected by the first prism L11, while the second quadrant V2 and the third quadrant V3 are positioned on the opposite side (the left side of the second reference plane P2 with respect to FIG. 5) of the second reference plane P2 to the side of the first quadrant V1 and the fourth quadrant V4.

Out of the left-side section and the right-side section of the second reference plane P2, optical elements of the imaging optical system such as the second lens element L2, the second lens group G2, the third lens group G3, the fourth lens group G4 and the second prism L12 are arranged along the second optical axis O2 in the right-side section (which includes the first quadrant V1 and the fourth quadrant V4) of the second reference plane P2. The pair of rods 22 and 23, the first motor M1 and the second motor M2, which constitute elements of the advancing/retracting drive mechanism for moving the second lens group G2 and the third lens group G3 along the second optical axis O2, are also arranged in the right-side section of the second reference plane P2.

On the other hand, the permanent magnets 60 and 61 and the coils 62 and 63, which constitute the electromagnetic actuator for driving the first lens element L1 to reduce image shake, and the magnetic sensors 65 and 66, which are for detecting the position of the first lens element L1 during driving thereof, are arranged in the second and third quadrants V2 and V3, which are positioned in the left-side section of the second reference plane P2 on the opposite side of the second reference plane P2 from the side toward the light-ray travelling direction along the second optical axis O2. More specifically, the permanent magnet 60, the coil 62 and the magnetic sensor 65 are positioned in the second quadrant V2; the permanent magnet 61, the coil 63 and the magnetic sensor 66 are positioned in the third quadrant V3; and each of the elements in the second quadrant V2 and each of the elements in the third quadrant V3 are arranged to be substantially symmetrical with respect to the first reference plane P1. The permanent magnets 60 and 61 are arranged so that the inclination angles of the magnetic pole boundary lines Q1 and Q2 thereof with respect to the first reference plane P1 are approximately ±45 degrees, respectively, as described above, and the directions of inclination of the magnetic pole boundary lines Q1 and Q2 are set to approach the first reference plane P1 (so as to reduce the distance between the magnetic pole boundary lines Q1 and Q2) in the leftward direction away from the second reference plane P2. Likewise, the coils 62 and 63 are arranged so that the inclination angles of the long axis of the coil 62 and the long axis of the coil 63 with respect to the first reference plane P1 become approximately ±45 degrees, respectively, and the directions of inclination of the long axes of the coils 62 and 63 are set to approach the first reference plane P1 (so as to reduce the distance between the long axes of the coils 62 and 63) in the leftward direction away from the second reference plane P2. In other words, the point of intersection between two straight lines respectively extending along the magnetic pole boundary lines Q1 and Q2 and the point of intersection between two straight lines respectively extending along the long axes of the coils 62 and 63 are positioned in the left-side section of the second reference plane P2, which is on the opposite side of the second reference plane P2 to that in which the second optical axis O2 extends.

The following effects are obtained by the above described arrangement of the permanent magnets 60 and 61 and the coils 62 and 63, which constitute elements of the anti-shake system for driving the first lens element L1. The arrangement of the electromagnetic actuator is not easily subjected to space restrictions because the second quadrant V2 and the third quadrant V3 are sections on the opposite side of the second reference plane P2 from the side toward the light-ray travelling direction along the second optical axis O2 and because none of the optical elements of the imaging optical system which are positioned optically rearward from the first prism L11 (rightward with respect to FIG. 3) are arranged in either the second quadrant V2 or the third quadrant V3. For instance, with the above described (illustrated) arrangement, it is possible to drive the first lens element L1 even if a combination of the permanent magnet 60 and the coil 62 and a combination of the permanent magnet 61 and the coil 63 are arranged in the first quadrant V1 and the fourth quadrant V4, respectively, to be symmetrical with respect to the second reference plane P2. However, the second lens element L2 is positioned in the first quadrant V1 and the fourth quadrant V4 at a position adjacent to the exit surface L11-$b$ of the first prism L11, so that in this case there is a problem of it being difficult to secure space for installing the entire electromagnetic actuator without interfering with the second lens element L2. Whereas, there is no such a restriction in the arrangement of the illustrated embodiment in which a combination of the permanent magnet 60 and the coil 62 provided in the second quadrant V2 and a combination of the permanent magnet 61 and the coil 63 provided in the third quadrant V3.

In general, to drive an object using voice coil motors, each of which includes a permanent magnet and a coil, two sets of permanent magnets and coils which have mutually different driving-force directions are used. The present embodiment of the imaging apparatus is provided with a combination of the permanent magnet 60 and the coil 62, the lengthwise (long-side) directions (the magnetic boundary line Q1 and the long axis of the coil 62) of which are parallel to each other, and a combination of the permanent magnet 61 and the coil 63, the lengthwise (long-side) directions (the magnetic boundary line Q2 and the long axis of the coil 63) of which are parallel to each other, and the direction of action F1 of the driving force generated by the former combination (the permanent magnet 60 and the coil 62) and the direction of action F2 of the driving force generated by the latter combination (the permanent magnet 61 and the coil 63) are orthogonal to each other. This arrangement makes it possible to move the first lens element L1 freely in a plane orthogonal to the first optical axis O1. In addition, the directions of inclination of the former combination (the permanent magnet 60 and the coil 62) and the latter combination (the permanent magnet 61 and the coil 63) are set so that the distance between the magnetic pole boundary lines Q1 and Q2 and the distance between the long axes of the coils 62 and 63 increase in the rightward direction (in which the second optical axis O2 extends) and so that the distance between the magnetic pole boundary lines Q1 and Q2 and the distance between the long axes of the coils 62 and 63 decrease in the opposite direction, i.e., the leftward direction. This arrangement makes it possible to accommodate the permanent magnet 60 and the coil 62 and the permanent magnet 61 and the coil 63 in the second quadrant V2 and the third quadrant V3 in the area that is peripheral to the lens holding portion 50 of the first lens frame 30, which is cylindrical in shape.

Just for the purpose of driving the first lens element L1, it is possible to make the directions of inclination of the permanent magnet 60 and the coil 62 and the permanent magnet 61 and the coil 63 with respect to the first reference plane P1 different from those in the above described embodiment. For instance, it is possible to drive the first lens element L1 in a plane orthogonal to the first optical axis O1 even if the magnetic pole boundary line Q1 of the permanent magnet 60 and the long axis of the coil 62 are parallel to one of the reference planes P1 and P2 and the magnetic pole boundary line Q2 of the permanent magnet 61 and the long axis of the coil 63 are parallel to the other reference plane P1 or P2. However, this arrangement causes at least one of a combination of the permanent magnet 60 and the coil 62 and a combination of the permanent magnet 61 and the coil 63 to enter the first quadrant V1 or the fourth quadrant V4 by a large amount, which deteriorates the aforementioned effect of using the second quadrant V2 and the third quadrant V3 that are subjected to less space restrictions. In addition, there is also a demerit of increasing in size of the anti-shake system in a direction along the first reference plane P1 because either a combination of the permanent magnet 60 and the coil 62 or a combination of the permanent magnet 61 and the coil 63 is positioned on the left-hand side of the movement limit projection 43 and the movement limit hole 53 with respect to FIG. 5.

In contrast, the anti-shake system can be installed in the second quadrant V2 and the third quadrant V3 in a space-efficient manner by setting the directions of inclination of the permanent magnets 60 and 61 and the coils 62 and 63 in a front view as shown in FIG. 5 as described in the above illustrated embodiment. Although the inclination angles of the magnetic pole boundary lines Q1 and Q2 of the permanent magnets 60 and 61 with respect to the first reference plane P1 are set to approximately ±45 degrees, respectively, and the inclination angles of the long axes of the coils 62 and 63 with respect to the first reference plane P1 are set to approximately ±45 degrees, respectively, in the above illustrated embodiment, the aforementioned effects of the space-saving design can also be obtained even if the inclination angles of the magnetic pole boundary lines Q1 and Q2 with respect to the first reference plane P1 and the inclination angles of the long axes of the coils 62 and 63 with respect to the first reference plane P1 are slightly changed. Specifically, if the inclination angles of the magnetic pole boundary lines Q1 and Q2 of the permanent magnets 60 and 61 with respect to the first reference plane P1 and the inclination angles of the long axes of the coils 62 and 63 with respect to the first reference plane P1 are each set to within ±35 to ±55 degrees, with the angle of the magnetic pole boundary lines Q1 and Q2 and the angle of the long axes of the coils 62 and 63 each maintained at 90 degrees, a space-saving arrangement of the anti-shake system is achieved.

Additionally, the second lens group G2 and the third lens group G3 that are movable along the second optical axis O2 are provided on an optical path extending from the first prism L11; the first motor M1 and the second motor M2 that respectively constitute drive systems of the second lens group G2 and the third lens group G3 contain metal parts; and the pair of rods 22 and 23 are also metal parts. If these metal parts are made of a magnetic material and are positioned near the electromagnetic actuator, there is a possibility of such metal parts exerting an adverse influence on the anti-shake driving operation of the electromagnetic actuator. In the moving-magnet electromagnetic actuator of the present embodiment of the anti-shake system in particular, in which the permanent magnets 60 and 61 are supported on the moveable first lens frame 30, in order to make the electromagnetic actuator perform drive control with high precision, it is required to remove the adverse influence caused by external magnetic materials on the magnetic fields of the permanent magnets 60 and 61. The permanent magnets 60 and 61 and the coils 62 and 63 that are arranged in the second quadrant V2 and the third quadrant V3 are farther from each motor M1 and M2 and each rod 22 and 23 than in the case where the permanent magnets 60 and 61 and the coils 62 and 63 were to be arranged in the first quadrant V1 and the fourth quadrant V4; therefore, any adverse influence of these parts of the electromagnetic actuator would not easily reach the driving of the electromagnetic actuator even when these parts contain magnetic metal.

As described above, the anti-shake system that is superior in space utilization and driving performance is obtained by the installation of the permanent magnets 60 and 61 and the coils 62 and 63 in the sections (the second quadrant V2 and the third quadrant V3) on the opposite side of the second reference plane P2 from the side toward the light-ray travelling direction along the second optical axis O2 and the arrangement of the permanent magnets 60 and 61 and the coils 62 and 63 in which the distance between the magnetic pole boundary lines Q1 and Q2 and the distance between the long axes of the coils 62 and 63 decrease in the direction opposite to the direction of extension of the second optical axis O2 in the arrangement of the anti-shake system for driving the first lens element L1.

Although the permanent magnets 60 and 61 and the coils 62 and 63 are entirely arranged in the second quadrant V2 and the third quadrant V3 in the above illustrated embodiment of the imaging apparatus, the permanent magnets 60 and 61 and the coils 62 and 63 can be alternatively arranged so as to partly project into the first and fourth quadrants V1 and V4 beyond the second reference plane P2. In this case, as a condition for obtaining the aforementioned effects for space utilization and drive performance of the anti-shake system, it is desirable that at least the centers U1 and U2 of the permanent magnets 60 and 61 and the centers U1 and U2 of the coils 62 and 63 be positioned on the left-hand side of the second reference plane P2, i.e., within the second quadrant V2 and the third quadrant V3, respectively.

Additionally, the slimming-down of the anti-shake system in the forward/rearward direction (depthwise direction) of the imaging unit 10 has been achieved. The permanent magnets 60 and 61, which constitute elements of drive sources of the anti-shake system, are fixed onto the flange 55 of the first lens frame 30. The flange 55 projects sideways from the lens holding portion 50, which is cylindrical in shape and holds the first lens element L1, and is positioned rearward (downward with respect to FIG. 7) from the position at which the first lens element L1 is supported by the lens holding portion 50 in a direction along the first optical axis O1 (i.e., in the forward/rearward direction; see FIG. 7). Consequently, in the forward/rearward direction, the positions of the permanent magnets 60 and 61, which are respectively supported by the flange 55 thereon, are set behind the first lens element L1 in the vicinity of the incident surface L11-*a* of the first prism L11.

The coils 62 and 63, which constitute, together with the permanent magnets 60 and 61, drive sources of the anti-shake system, and the magnetic sensors 65 and 66, which detect the position of the first lens element L1, are held at positions overlapping the first lens element L1 in the forward/rearward direction in a state where the cover member 32 is mounted to the base member 31 (see FIG. 2).

As described above, in a space lateral to the first lens element L1 and the first prism L11, the permanent magnets 60 and 61 and the coils 62 and 63 are arranged so that the permanent magnet 60 and the coil 62 superpose each other in the forward/rearward direction and so that the permanent magnet 61 and the coil 63 superpose each other in the forward/rearward direction, and accordingly, the electromagnetic actuator can be installed in a space-efficient manner in the forward/rearward direction, which contributes to slimming of the imaging unit 10.

As shown in FIGS. 5, 8, 9 and 10, the arrangement of the magnetic sensors 65 and 66 on the outside of the coils 62 and 63 is also superior in space efficiency. The permanent magnets 60 and 61 and the coils 62 and 63 are arranged so that the directions of inclination of a combination of the permanent magnet 60 and the coil 62 and a combination of the permanent magnet 61 and the coil 63 approach the first reference plane P1 in a direction away from the second reference plane P2, so that a substantially triangular space is obtained between each of the two left corners of the first lens group unit 12 (the upper left corner and the lower left corner of the base plate 35 of the base member 31 with respect to FIGS. 5 and 11), which is substantially rectangular in shape in a front orthographic projection, and the installation area of the electromagnetic actuator. In other words, two substantially triangular spaces are obtained on the front of the base plate 35 in the vicinity of the upper left corner and the lower left corner of the base plate 35 as viewed from front, respectively. The magnetic sensors 65 and 66 are installed while utilizing these two triangular spaces. Specifically, since the permanent magnet 60 is greater in width than the coil 62 in the direction of action F1 of the driving force generated by energizing the coil 62, and the permanent magnet 61 is greater in width than the coil 63 in the direction of action F2 of the driving force generated by energizing the coil 63 and since the magnetic sensor 65 is positioned adjacent to the outer linear portion of the coil 62 while the magnetic sensor 66 is positioned adjacent to the outer linear portion of the coil 66, both the amount of projection of the magnetic sensor 65 from the permanent magnet 60 in a direction away from the first optical axis O1 and the amount of projection of the magnetic sensor 66 from the permanent magnet 61 in a direction away from the first optical axis O1 have been minimized. Accordingly, an increase in size of the front orthographic projection shape of the imaging unit 10 which may be caused by installation of the magnetic sensors 65 and 66 can be prevented from occurring.

Although the centers U3 and U4 of the magnetic sensors 65 and 66 are spaced from the centers U1 and U2 of the permanent magnets 60 and 61, respectively, as shown in FIGS. 5 and 10, since each magnetic sensor 65 and 66 is positioned close to the associated permanent magnet 60 or 61 to a degree to be partly included in the front orthographic projection area of the associated permanent magnet 60 or 61 as shown in FIGS. 8 and 9 as the overlapping range K2, the magnetic sensors 65 and 66 can achieve a sufficient detection accuracy.

The position of the first lens frame 30 can be detected even if the magnetic sensors 65 and 66 are positioned behind the magnetic sensors 60 and 61 in a direction along the first optical axis O1, unlike the above described embodiment. However, in this case, it is required to provide space for the installation of the sensors behind the permanent magnets 60 and 61. In contrast, according to the arrangement of the magnetic sensors 65 and 66 in the above illustrated embodiment of the imaging apparatus, no space for the installation of the sensors is required behind the permanent magnets 60 and 61, and an effect of reducing the thickness of the imaging unit 10 in the forward/rearward direction can also be obtained. Specifically, further slimming of the imaging unit 10 is achieved because the magnetic sensor 65 and the coil 62 overlap each other and the magnetic sensor 66 and the coil 63 overlap each other in a direction along the first optical axis O1 as shown in FIGS. 8 and 9 as the overlapping range K1.

Features of the arrangement of the electromagnetic actuator in the first lens group unit 12 has been described above, and the support structure for the first lens frame 30 on the base member 31 will be discussed hereinafter.

First, the first lens frame 30 is supported to be movable along a plane orthogonal to the first optical axis O1 and is prevented from coming off the base member 31 in a direction along the first optical axis O1 by the above described structure in which each guide shaft 41A, 41B or and 41C is held by the associated slidable support portion 51A, 51B or 51C (between the pair of projections 52 thereof), which has two walls opposed in a direction along the first optical axis O1 and is U-shaped in cross section. Therefore, a biaser such as a spring(s) is not required to be provided for holding the first lens frame 30 on the base member 31, so that simplification of the support structure for the first lens frame 30 on the base member 31 has been achieved. Additionally, the support structure for the first lens frame 30 on the base member 31 is superior in assembling workability because the state of supporting the first lens frame 30 is completed by inserting each guide shaft 41A, 41B and 41C into the elongated open groove T1 of the associated guide support portion 40A, 40B or 40C and the elongated open groove T2 of the associated slidable support member 51A, 51B or 51C from one side (the upper side, the lower side or the left side) of the first lens group unit 12.

As described above, the optical elements of the imaging optical system which are positioned optically rearward from the first prism L11 are arranged on the second optical axis O2 that is deflected by the first prism L11 (i.e., arranged in the first quadrant V1 and the fourth quadrant V4), so that space is limited on the second optical axis O2 side. For instance, if a supporter for the first lens frame 30 is installed at a position along the exit surface L11-b (the exit long-side of the incident surface L11-a) of the first prism L11, there is a possibility of this supporter interfering with the second lens element L2 or the lens holding portion 39. Whereas, in the first lens group unit 12 of the above described embodiment of the imaging apparatus, the guide shafts 41A, 41B and 41C and the guide support portions 40A, 40B and 40C, which support the first lens frame 30 in a manner to allow the first lens frame 30 to move relative to the base member 31, are arranged in a U-shaped area along the three sides of the incident surface L11-a except the exit long-side thereof as viewed along the first optical axis O1 from the front, as shown in FIGS. 10 and 11, thus not interfering with either the second lens element L2 or the lens holding portion 39.

Out of the guide shafts 41A, 41B and 41C and the guide support portions 40A, 40B and 40C, the two guide shafts 41A and 41B and the guide support portions 40A and 40B are arranged on either side of the first reference plane P1 along the pair of side surfaces L11-d (along the short sides of the incident surface L11-a) of the first prism L11 as viewed from the front, as shown in FIGS. 5 and 10. As shown in FIGS. 10 and 11, the axes of the guide shafts 41A and 41B are substantially parallel to the reference plate P1 (the second optical axis O2), and the length of each guide shaft 41A and 41B in the axial direction thereof substantially fits within the installation range of the first prism L11. Accordingly, the installation of the guide shafts 41A and 41B does not cause an increase in size of the first lens group unit 12 in the leftward/rightward direction (lengthwise direction) of the imaging unit 10. Additionally, the amount of projection of the guide shafts 41A and 41B and the slidable support portions 51A and 51B from both sides of the lens holding portion 50 of the first lens frame 30 in the upward/downward direction (widthwise direction) of the imaging unit 10 (in directions away from the first reference plane P1) have been reduced to the same degree as the permanent magnets 60 and 61 and the coils 62 and 63 that constitute an electromagnetic actuator as shown in FIGS. 5 and 10, which achieves a reduction in size of the imaging unit 10 in the upward/downward (widthwise) direction thereof. Due chiefly to the arrangement of the guide shafts 41A and 41B, in which the axes thereof extend substantially parallel to the first reference plane P1 in a plane orthogonal to the first optical axis O1, the amount of projection of the guide shafts 41A and 41B in the upward/downward direction (widthwise direction) of the imaging unit 10 is to a minimum compared to the case where the guide shafts 41A and 41B are arranged so that the axes thereof extend in a direction intersecting the first reference plane P1 in a plane orthogonal to the first optical axis O1.

In addition, support portions for the first lens frame 30 by the guide shafts 41A and 41B are arranged to be spaced from each other in the direction of the long sides of the incident surface L11-a of the first prism L11 to be positioned at substantially equal distances from the first reference plane P1; this arrangement makes it possible to support the first lens frame 30 in a balanced manner in the upward/downward direction. Additionally, the support structure for the first lens frame 30 is also superior in supporting balance in the leftward/rightward direction (in the direction of the short sides of the incident surface L11-a of the first prism L11) because the pair of projections 52 of the slidable support portion 51A that holds the guide shaft 41A therebetween and the pair of projections 52 of the slidable support portion 51B that holds the guide shaft 41B therebetween lie in the second reference plane P2.

To support the first lens frame 30 on the base member 31 with stability, it is desirable to support the first lens frame 30 at three or more points of support. Accordingly, in addition to the two support points by the guide shafts 41A and 41B and the slidable support portions 51A and 51B that are arranged on both sides of the first reference plane P1, the first lens group unit 12 is provided with a combination of the guide shaft 41C and the slidable support portion 51C as a third support portion. As shown in FIGS. 5 and 10, the guide shaft 41C and the slidable support portion 51C are arranged in the vicinity of the left end of the first lens group unit 12 to substantially fit into the space between the permanent magnets 60 and 61 and the coils 62 and 63 in the upward/downward direction. Accordingly, the installation of the guide shaft 41C does not cause an increase in size of the first lens group unit 12 in the upward/downward direction (widthwise direction) of the imaging unit 10. In addition, due to the arrangement of the guide shaft 41C, in which the axis thereof extends substantially parallel to the second reference plane P2 in a plane orthogonal to the first optical axis O1, the amount of projection of the guide shaft 41C in the leftward direction of the imaging unit 10 is to a minimum compared with the case where the guide shaft 41C is arranged so that the axis thereof extends in a direction intersecting the second reference plane P2 in a plane orthogonal to the first optical axis O1.

As can be seen from above, the above illustrated support structure for the first lens frame 30, in which the first lens frame 30 is supported to be movable by the guide shafts 41A, 41B and 41C that are arranged in an area (U-shaped area) along the three sides of the incident surface L11-a of the first prism L11 except the exit long-side thereof, contributes to miniaturization of the imaging unit 10.

As a different embodiment of the imaging apparatus from the above illustrated embodiment of the imaging apparatus, instead of providing the first lens group unit 12 with the guide shaft 41C, it is possible to provide a third support portion by making at least one of the guide shaft 41A and the guide shaft 41B extend in the axial direction thereof and making part of the first lens frame 30 engaged with this extended portion of the guide shaft 41A and the guide shaft 41B. However, if the guide shafts 41A and 41B are extended in the second quadrant V2 and the third quadrant V3, respectively, the extended portions of the guide shafts 41A and 41B would interfere with the electromagnetic actuator because the permanent magnets 60 and 61, the coils 62 and 63 and the magnetic sensors 65 and 66, which constitute an electromagnetic actuator, are arranged in the second and third quadrants V2 and V3 around the first lens element L1, as can be seen from FIGS. 5 and 10. Additionally, the exit-side flange 37 that is in contact with the body module 11 is provided in the first and fourth quadrants V1 and V4, so that there is almost no space for allowing the guide shafts 41A and 41B to extend on this side. Accordingly, the structure in which the guide shaft 41C (third support portion), the axis of which extends in a direction parallel to the second reference plane P2, is installed in a space (the second quadrant V2 and the third quadrant V3) on the opposite side of the second reference plane P2 from the side on which the second optical axis O2 extends is superior in space efficiency. In other words, due to the arrangement in which the permanent magnets 60 and 61, the coils 62 and 63 and the magnetic sensors 65 and 66, which constitute an electromagnetic actuator, and the first lens element L1, etc., are arranged in a U-shaped area defined by the outer profiles of the guide shafts 41A, 41B and 41C when the first lens group unit 12 is viewed from front as shown in FIG. 5, an optimum space efficiency has been achieved.

The movement limit projection 43 and the movement limit hole 53, and the swing pivot 44 and the pivot support groove 54 also constitute elements of the support structure for the first lens frame 30. As shown in FIGS. 5, 10 and 11, the movement limit projection 43 and the movement limit hole 53 are arranged with space efficiency at a position surrounded by the lens holding portion 50, the electromagnetic actuator (the permanent magnets 60 and 61 and the coils 62 and 63) and the slidable support portion 51C.

The swing pivot 44 and the pivot support groove 54 are provided in the fourth quadrant V4, thus not interfering with the electromagnetic actuator and other elements that are provided in the second quadrant V2 and the third quadrant V3. In addition, the swing pivot 44 and the pivot support groove 54 are arranged outside the area near the boundary between the circular portion and the D-cut portion of the first lens element L1 and nestled in the fourth quadrant V4 with space efficiency without interfering with the second lens element L2.

Although the present invention has been described based on the above illustrated embodiment, the present invention is not limited solely thereto; various modifications to the above illustrated embodiment are possible. For instance, the present invention can also be applied to a type of imaging apparatus which has an L-shaped optical path without including a second reflector corresponding to the second prism L12 in an imaging optical system. Alternatively, the present invention can be applied to an imaging apparatus which contains a bending optical system including one or more additional reflectors in addition to the first prism L11 and the second prism L12. The bending angle (reflecting angle) of an optical axis by each prism of the bending optical system can be any angle other than 90 degrees.

Although the guide shafts 41A, 41B and 41C are cylindrical columnar in shape in the above illustrated embodiment of the imaging apparatus, guide members having a different cross sectional shape such as rectangular or square columns can be used instead.

Although the operating direction of the first lens frame 30 relative to the base member 31 is defined using the swing pivot 44 and the pivot support groove 54 in the above illustrated embodiment of the imaging apparatus, it is possible to define the operating direction by providing a different actuator instead of the swing pivot 44 and the pivot support groove 54.

Additionally, the above illustrated embodiment of the electromagnetic actuator is a moving-magnet electromagnetic actuator in which the permanent magnets 60 and 61 are supported by the movable first lens frame 30 and the coils 62 and 63 are supported by the immovable cover member 32. This type of electromagnetic actuator is superior in wiring routing for coils and magnetic sensors; however, the present invention is also applicable to a moving-coil electromagnetic actuator in which the coils 62 and 63 are supported by the first lens frame 30 that is movable and the permanent magnets 60 and 61 are supported by the base member 31 or the cover member 32 that is immovable. In such a case, it is advisable that the magnetic sensors 65 and 66 be also provided on the first lens frame 30.

Although each of the permanent magnets 60 and 61 has a rectangular shape in a front view that is elongated in a direction along the associated magnetic boundary line Q1 or Q2 and each of the coils 62 and 63 has an elongated shape in a front view that is elongated in a direction along the associated magnetic boundary line Q1 or Q2 in the above illustrated embodiment of the anti-shake system, the present invention can also be applied to an anti-shake system having permanent magnets and coils which are different in shape from the permanent magnets 60 and 61 and the coils 62 and 63. Specifically, the permanent magnets of the anti-shake system can be replaced by, e.g., permanent magnets that each has a square shape in a front view.

Although the center U1 of the permanent magnet 60 and the center U1 of the coil 62 substantially coincide with each other in a plane orthogonal to the first optical axis O1 and the center U2 of the permanent magnet 61 and the center U2 of the coil 63 substantially coincide with each other in a plane orthogonal to the first optical axis O1 when the first lens frame 30 is positioned at the center of the moving range thereof in the above illustrated embodiment of the anti-shake system, the present invention can also be applied to an imaging apparatus equipped with an anti-shake system in which the center of each permanent magnet and the center of the associated coil do not coincide (are not aligned) with each other in an initial state of the anti-shake system.

Although the second lens group G2, the third lens group G3 and the fourth lens group G4 are provided on the second optical axis O2 in the above illustrated embodiment of the imaging apparatus, the present invention can also be applied to an imaging optical system in which less than or more than three lens groups are provided on an optical axis of the imaging optical system which corresponds to the second optical axis O2.

Additionally, in the first lens group G1, it is possible to change the number of lens elements arranged in front of the incident surface L11-a of the first prism L11 on the first optical axis O1 and the number of lens elements arranged on the right-hand side of the exit surface L11-b of the first prism L11 on the second optical axis O2. For instance, the first lens element L1 in the above illustrated embodiment can be replaced by two or more front lens elements which are arranged in front of the first prism L11. In such a case, the distances between the front lens elements arranged in front of the first prism L11 are small, and accordingly, to prevent the aberrations from deteriorating, it is advisable to perform anti-shake control by moving all the plurality of front lens elements, arranged in front of the first prism L11, in directions orthogonal to the first optical axis O1. Additionally, although the second lens element L2 is arranged on the right-hand side of the first prism L11 in the above illustrated embodiment, the number of lens elements in the first lens group G1 which are arranged on the optical path extending from the exit surface L11-b of the first prism L11 toward the second lens group G2 can be more than one. Additionally, it is possible to modify the first lens group G1 so as not to include any lens element on the optical path extending from the exit surface L11-b of the first prism L11 toward the second lens group G2.

The length of the optical path from the incident surface of the first lens element L1 to the image plane in the imaging unit 10 is constant at all times in the above described embodiment. In this type of imaging optical system, the first lens element L1 that is the closest to the object side is generally a negative lens. However, the lens element (front lens element) for use in anti-shake control in the imaging apparatus according to the present invention can be a positive lens. Regardless of whether the power of the front lens element is negative or positive, any lens element can be adopted as the front lens element as long as it has a refractive power.

Additionally, although the imaging optical system of the above illustrated embodiment of the imaging unit 10 is a zoom lens (variable power optical system) which performs a zooming operation (power varying operation) by moving the second lens group G2 and the third lens group G3 along the second optical axis O2, the present invention is also applicable to an imaging apparatus which incorporates an imaging optical system having no power varying capability. For instance, it is possible to modify the imaging unit 10 such that the second lens group G2 and the third lens group G3 do not move for a zooming operation and that the second lens group G2 or the third lens group G3 moves solely for a focusing operation.

Although the incident surface L11-a of the first prism L11 in the above illustrated embodiment of the imaging apparatus is in the shape of a laterally elongated rectangle, the present invention can also be applied to a type of imaging apparatus having a first prism (which corresponds to the first prism L11), the incident surface thereof having a different shape such as a square or a trapezoid.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus comprising:
a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
at least one rear lens group which constitutes another part of said imaging optical system and is provided closer to an image plane than said front lens group; and
an anti-shake system which drives said front lens element along a plane orthogonal to said first optical axis, in response to vibrations applied to said imaging optical system, to reduce image shake on said image plane,
wherein said anti-shake system comprises:
a movable frame which supports said front lens element of said front lens group for movement; and
a base member which supports at least said prism of said front lens group, said base member and said prism being stationary relative to the movable frame;
at least two opposing guide shafts which are arranged, as viewed along said first optical axis, along opposite sides of said prism on both sides of a reference plane, respectively, in which said first optical axis and said second optical axis lie, to support said movable frame in a manner to allow said movable frame to move to an arbitrary position within a moving range of the movable frame within the plane orthogonal to said first optical axis, relative to said base member.

2. The imaging apparatus according to claim 1, wherein said anti-shake system further comprises a third guide member, which supports said movable frame so as to allow said movable frame to move along said plane that is orthogonal to said first optical axis relative to said base member,
wherein said third guide member is positioned on one side of a second reference plane, which includes said first optical axis and is orthogonal to said reference plane, so that said second optical axis extends on the other side of said second reference plane in a direction away from said second reference plane.

3. The imaging apparatus according to claim 2, wherein said third guide member comprises a third guide shaft, an axis of the third guide shaft lies in a plane orthogonal to said first optical axis,
wherein said movable member comprises a third slidable support portion which holds said third guide shaft from both sides thereof in a direction parallel to said first optical axis so that said third slidable support portion is supported by said third guide shaft to be slidable along said plane orthogonal to said first optical axis.

4. The imaging apparatus according to claim 3, wherein an axis of said third guide shaft is parallel to said second reference plane.

5. The imaging apparatus according to claim 1, wherein said opposing guide shafts comprise two side guide shafts, axes of the side guide shafts lie in a plane orthogonal to said first optical axis,
wherein said movable member comprises two side slidable support portions, each of which holds an associated one of said side guide shafts from both sides thereof in a direction parallel to said first optical axis so that each of said side slidable support portions is supported by the associated said side guide shaft to be slidable along said plane orthogonal to said first optical axis.

6. The imaging apparatus according to claim 5, wherein each of said side slidable support portions of said movable frame and said base member comprises an open groove having an opening into which an associated said side guide shaft is insertable in a direction to approach said first optical axis along said plane that is orthogonal to said first optical axis,
wherein said open groove of said base member fixedly holds an associated said side guide shaft that is inserted into an associated said opening, and
wherein said open groove of each said side slidable support portion of said movable frame slidably contacts an associated said side guide shaft that is inserted into associated said opening.

7. The imaging apparatus according to claim 6, wherein each of said side slidable support portions comprises at least one projection which is provided in an associated said open groove to project in a direction parallel to said first optical axis to contact an associated said side guide shaft.

8. The imaging apparatus according to claim 6, further comprising a cover member which is mounted to said base member and includes an outer surrounding wall for closing said openings of said open grooves of said side slidable support portions of said movable frame and said base member.

9. The imaging apparatus according to claim 5, wherein axes of said side guide shafts are parallel to said reference plane and substantially equi-distant from said reference plane.

10. The imaging apparatus according to claim 1, wherein said anti-shake system comprises:
a first voice coil motor which includes a first coil and a first magnet that are mounted to one and the other of said base member and said movable frame, respectively, so as to be opposed in a direction parallel to said first optical axis, wherein said first voice coil motor generates a driving force in a first direction orthogonal to a magnetic pole boundary line of said first magnet upon said first coil being energized; and
a second voice coil motor which includes a second coil and a second magnet that are mounted to said one and said other of said base member and said movable frame, respectively, so as to be opposed in a direction parallel to said first optical axis, wherein said second voice coil motor generates a driving force in a second direction orthogonal to a magnetic pole boundary line of said second magnet upon said second coil being energized,
wherein said first magnet and said second magnet are positioned so that directions of said magnetic pole boundary lines thereof are orthogonal to each other in a plane orthogonal to said first optical axis,
wherein said first coil and said second coil are positioned to face said first magnet and said second magnet, respectively, in a direction parallel to said first optical axis, and
wherein centers of said first magnet and said second magnet and centers of said first coil and said second coil are positioned on one side of a second reference plane which includes said first optical axis and is orthogonal to said reference plane, wherein said second optical axis extends on the other side of said second reference plane in a direction away from said second reference plane.

11. The imaging apparatus according to claim 10, wherein a combination of said first coil and said first magnet and a combination of said second coil and said second magnet are positioned on opposite sides of said reference plane, respectively.

12. An imaging apparatus comprising:
- a front lens group which constitutes part of an imaging optical system of said imaging apparatus and is provided at a fixed position with respect to an optical axis direction, wherein said front lens group includes at least one front lens element and a prism, in that order from an object side, and wherein light rays exiting from said front lens element along a first optical axis are reflected by said prism to travel along a second optical axis that is nonparallel to said first optical axis;
- at least one rear lens group which constitutes another part of said imaging optical system and is provided closer to an image plane than said front lens group; and
- an anti-shake system which drives said front lens element along a plane orthogonal to said first optical axis, in response to vibrations applied to said imaging optical system, to reduce image shake on said image plane,
- wherein said anti-shake system comprises:
- a base member which supports at least said prism of said front lens group;
- a movable frame which supports said front lens element of said front lens group;
- at least two opposing guide members which are arranged, as viewed along said first optical axis, along opposite sides of said prism on both sides of a reference plane, respectively, in which said first optical axis and said second optical axis lie, to support said movable frame in a manner to allow said movable frame to move along said plane that is orthogonal to said first optical axis relative to said base member;
- a first voice coil motor which includes a first coil and a first magnet that are mounted to one and the other of said base member and said movable frame, respectively, so as to be opposed in a direction parallel to said first optical axis, wherein said first voice coil motor generates a driving force in a first direction orthogonal to a magnetic pole boundary line of said first magnet upon said first coil being energized; and
- a second voice coil motor which includes a second coil and a second magnet that are mounted to said one and said other of said base member and said movable frame, respectively, so as to be opposed in a direction parallel to said first optical axis, wherein said second voice coil motor generates a driving force in a second direction orthogonal to a magnetic pole boundary line of said second magnet upon said second coil being energized;
- wherein said first magnet and said second magnet are positioned so that directions of said magnetic pole boundary lines thereof are orthogonal to each other in a plane orthogonal to said first optical axis,
- wherein said first coil and said second coil are positioned to face said first magnet and said second magnet, respectively, in a direction parallel to said first optical axis;
- wherein centers of said first magnet and said second magnet and centers of said first coil and said second coil are positioned on one side of a second reference plane which includes said first optical axis and is orthogonal to said reference plane, wherein said second optical axis extends on the other side of said second reference plane in a direction away from said second reference plane,
- wherein said opposing guide members comprises two side guide shafts, axes of the two side guide shafts lie in a plane orthogonal to said first optical axis, are parallel to said reference plane and are substantially equi-distant from said reference plane,
- wherein said anti-shake system further includes a third guide shaft, an axis of the third guide shaft lies in a plane orthogonal to said first optical axis and is parallel to said second reference plane,
- wherein said third guide shaft is positioned on one side of said second reference plane and said second optical axis extends on the other side of said second reference plane in a direction away from said second reference plane,
- wherein said movable member includes at least three slidable support portions, each of which holds an associated one of said side guide shafts and said third guide shaft from both sides thereof in a direction parallel to said first optical axis so that each of said slidable support portions is supported by said associated said side guide shaft and third guide shaft to be slidable along said plane orthogonal to said first optical axis, and
- wherein, as viewed along said first optical axis, said first permanent magnet, said second permanent magnet, said first coil and said second coil are arranged in a U-shaped area defined by said side guide shafts and said third guide shaft.

13. The imaging apparatus according to claim 12, wherein a combination of said first coil and said first magnet and a combination of said second coil and said second magnet are positioned on opposite sides of said reference plane, respectively.

14. The imaging apparatus according to claim 12, wherein said anti-shake system further comprises a third guide member, which supports said movable frame so as to allow said movable frame to move along said plane that is orthogonal to said first optical axis relative to said base member, and
- wherein said third guide member is positioned on one side of a second reference plane, which includes said first optical axis and is orthogonal to said reference plane, so that said second optical axis extends on the other side of said second reference plane in a direction away from said second reference plane.

* * * * *